US008618868B2

(12) United States Patent
Khlat et al.

(10) Patent No.: US 8,618,868 B2
(45) Date of Patent: Dec. 31, 2013

(54) SINGLE CHARGE-PUMP BUCK-BOOST FOR PROVIDING INDEPENDENT VOLTAGES

(75) Inventors: Nadim Khlat, Cugnaux (FR); Joseph Hubert Colles, Bonsall, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 0 days.

(21) Appl. No.: 13/222,453

(22) Filed: Aug. 31, 2011

(65) Prior Publication Data

US 2013/0043931 A1 Feb. 21, 2013

Related U.S. Application Data

(60) Provisional application No. 61/524,482, filed on Aug. 17, 2011.

(51) Int. Cl.
*G05F 1/10* (2006.01)
(52) U.S. Cl.
USPC ............................................. 327/536; 363/60
(58) Field of Classification Search
USPC ....................................... 327/536; 363/59–60
See application file for complete search history.

(56) References Cited

U.S. PATENT DOCUMENTS

| | | |
|---|---|---|
| 4,996,500 A | 2/1991 | Larson et al. |
| 5,311,309 A | 5/1994 | Ersoz et al. |
| 5,351,087 A | 9/1994 | Christopher et al. |
| 5,414,614 A | 5/1995 | Fette et al. |
| 5,420,643 A | 5/1995 | Romesburg et al. |
| 5,486,871 A | 1/1996 | Filliman et al. |
| 5,532,916 A | 7/1996 | Tamagawa |
| 5,581,454 A | 12/1996 | Collins |
| 5,646,621 A | 7/1997 | Cabler et al. |
| 5,715,526 A | 2/1998 | Weaver, Jr. et al. |
| 5,767,744 A | 6/1998 | Irwin et al. |

(Continued)

FOREIGN PATENT DOCUMENTS

| | | |
|---|---|---|
| EP | 0755121 A2 | 1/1997 |
| EP | 1492227 A1 | 12/2004 |

(Continued)

OTHER PUBLICATIONS

Li et al., "A highly efficient SiGe differential power amplifier using an envelope-tracking technique for 3GPP LTE application," IEEE Biploar/BiCMOS Circuits and Technology Meeting (BCTM), Oct. 4-6, 2010, pp. 121-124.

(Continued)

*Primary Examiner* — Thomas J Hiltunen
(74) *Attorney, Agent, or Firm* — Withrow & Terranova, P.L.L.C.

(57) ABSTRACT

Disclosed is a charge pump having first and second outputs and at least one capacitor. A plurality of switches are coupled to the at least one capacitor for selectively coupling the at least one capacitor between a high voltage node and a low voltage node, and for selectively coupling the at least one capacitor to the first output and the second output. A switch controller is adapted to generate control signals for the plurality of switches to selectively couple the at least one capacitor between the high voltage node and the low voltage node during charging, and to selectively couple the at least one capacitor to the first output and the second output during discharging that output a first voltage pulse from the first output and a second voltage pulse from the second output such that the first voltage pulse and the second voltage pulse are asymmetrical and coincidental.

24 Claims, 16 Drawing Sheets

(56) References Cited

U.S. PATENT DOCUMENTS

| | | | |
|---|---|---|---|
| 5,822,318 A | 10/1998 | Tiedemann, Jr. et al. | |
| 5,898,342 A | 4/1999 | Bell | |
| 5,905,407 A | 5/1999 | Midya | |
| 5,936,464 A | 8/1999 | Grondahl | |
| 6,043,610 A * | 3/2000 | Buell | 315/169.3 |
| 6,043,707 A | 3/2000 | Budnik | |
| 6,055,168 A | 4/2000 | Kotowski et al. | |
| 6,070,181 A | 5/2000 | Yeh | |
| 6,118,343 A | 9/2000 | Winslow | |
| 6,141,541 A | 10/2000 | Midya et al. | |
| 6,147,478 A | 11/2000 | Skelton et al. | |
| 6,198,645 B1 | 3/2001 | Kotowski et al. | |
| 6,204,731 B1 * | 3/2001 | Jiang et al. | 330/310 |
| 6,256,482 B1 | 7/2001 | Raab | |
| 6,300,826 B1 | 10/2001 | Mathe et al. | |
| 6,348,780 B1 | 2/2002 | Grant | |
| 6,559,689 B1 | 5/2003 | Clark | |
| 6,583,610 B2 | 6/2003 | Groom et al. | |
| 6,617,930 B2 | 9/2003 | Nitta | |
| 6,621,808 B1 | 9/2003 | Sadri | |
| 6,624,712 B1 | 9/2003 | Cygan et al. | |
| 6,658,445 B1 | 12/2003 | Gau et al. | |
| 6,681,101 B1 | 1/2004 | Eidson et al. | |
| 6,690,652 B1 | 2/2004 | Sadri | |
| 6,701,141 B2 | 3/2004 | Lam | |
| 6,728,163 B2 | 4/2004 | Gomm et al. | |
| 6,819,938 B2 | 11/2004 | Sahota | |
| 6,995,995 B2 | 2/2006 | Zeng et al. | |
| 7,058,373 B2 | 6/2006 | Grigore | |
| 7,164,893 B2 | 1/2007 | Leizerovich et al. | |
| 7,233,130 B1 | 6/2007 | Kay | |
| 7,411,316 B2 | 8/2008 | Pai | |
| 7,528,807 B2 * | 5/2009 | Kim et al. | 345/76 |
| 7,529,523 B1 | 5/2009 | Young et al. | |
| 7,539,466 B2 | 5/2009 | Tan et al. | |
| 7,595,569 B2 | 9/2009 | Amerom et al. | |
| 7,609,114 B2 | 10/2009 | Hsieh et al. | |
| 7,615,979 B2 | 11/2009 | Caldwell | |
| 7,627,622 B2 | 12/2009 | Conrad et al. | |
| 7,646,108 B2 | 1/2010 | Paillet et al. | |
| 7,653,366 B2 | 1/2010 | Grigore | |
| 7,696,735 B2 * | 4/2010 | Oraw et al. | 323/282 |
| 7,715,811 B2 | 5/2010 | Kenington | |
| 7,724,837 B2 | 5/2010 | Filimonov et al. | |
| 7,773,691 B2 | 8/2010 | Khlat et al. | |
| 7,777,459 B2 | 8/2010 | Williams | |
| 7,782,036 B1 | 8/2010 | Wong et al. | |
| 7,783,269 B2 | 8/2010 | Vinayak et al. | |
| 7,805,115 B1 | 9/2010 | McMorrow et al. | |
| 7,859,336 B2 | 12/2010 | Markowski et al. | |
| 7,880,547 B2 | 2/2011 | Lee et al. | |
| 7,894,216 B2 | 2/2011 | Melanson | |
| 7,907,010 B2 | 3/2011 | Wendt et al. | |
| 7,923,974 B2 | 4/2011 | Martin et al. | |
| 7,994,864 B2 * | 8/2011 | Chen et al. | 330/297 |
| 8,000,117 B2 * | 8/2011 | Petricek | 363/60 |
| 8,008,970 B1 | 8/2011 | Homol et al. | |
| 8,022,761 B2 | 9/2011 | Drogi et al. | |
| 8,026,765 B2 | 9/2011 | Giovannotto | |
| 8,068,622 B2 | 11/2011 | Melanson et al. | |
| 8,081,199 B2 | 12/2011 | Takata et al. | |
| 8,093,951 B1 * | 1/2012 | Zhang et al. | 330/251 |
| 8,164,388 B2 | 4/2012 | Iwamatsu | |
| 8,174,313 B2 | 5/2012 | Vice | |
| 8,198,941 B2 | 6/2012 | Lesso | |
| 8,204,456 B2 | 6/2012 | Xu et al. | |
| 8,542,061 B2 | 9/2013 | Levesque et al. | |
| 2002/0071497 A1 | 6/2002 | Bengtsson et al. | |
| 2003/0017286 A1 | 1/2003 | Williams et al. | |
| 2003/0031271 A1 | 2/2003 | Bozeki et al. | |
| 2003/0062950 A1 | 4/2003 | Hamada et al. | |
| 2003/0137286 A1 | 7/2003 | Kimball et al. | |
| 2003/0206603 A1 | 11/2003 | Husted | |
| 2003/0220953 A1 | 11/2003 | Allred | |
| 2003/0232622 A1 | 12/2003 | Seo et al. | |
| 2004/0047329 A1 | 3/2004 | Zheng | |
| 2004/0124913 A1 | 7/2004 | Midya et al. | |
| 2004/0196095 A1 | 10/2004 | Nonaka | |
| 2004/0219891 A1 | 11/2004 | Hadjichristos | |
| 2004/0266366 A1 | 12/2004 | Robinson et al. | |
| 2004/0267842 A1 | 12/2004 | Allred | |
| 2005/0008093 A1 | 1/2005 | Matsuura et al. | |
| 2005/0032499 A1 | 2/2005 | Cho | |
| 2005/0047180 A1 | 3/2005 | Kim | |
| 2005/0064830 A1 | 3/2005 | Grigore | |
| 2005/0093630 A1 | 5/2005 | Whittaker et al. | |
| 2005/0122171 A1 | 6/2005 | Miki et al. | |
| 2005/0156662 A1 | 7/2005 | Raghupathy et al. | |
| 2005/0157778 A1 | 7/2005 | Trachewsky et al. | |
| 2006/0128324 A1 | 6/2006 | Tan et al. | |
| 2006/0178119 A1 | 8/2006 | Jarvinen | |
| 2006/0181340 A1 | 8/2006 | Dhuyvetter | |
| 2006/0244513 A1 | 11/2006 | Yen et al. | |
| 2007/0014382 A1 | 1/2007 | Shakeshaft et al. | |
| 2007/0024360 A1 | 2/2007 | Markowski | |
| 2007/0183532 A1 | 8/2007 | Matero | |
| 2007/0259628 A1 | 11/2007 | Carmel et al. | |
| 2008/0044041 A1 | 2/2008 | Tucker et al. | |
| 2008/0081572 A1 | 4/2008 | Rofougaran | |
| 2008/0150619 A1 | 6/2008 | Lesso et al. | |
| 2008/0205095 A1 | 8/2008 | Pinon et al. | |
| 2008/0242246 A1 | 10/2008 | Minnis et al. | |
| 2008/0252278 A1 | 10/2008 | Lindeberg et al. | |
| 2008/0280577 A1 | 11/2008 | Beukema et al. | |
| 2009/0004981 A1 | 1/2009 | Eliezer et al. | |
| 2009/0097591 A1 | 4/2009 | Kim | |
| 2009/0167260 A1 * | 7/2009 | Pauritsch et al. | 323/233 |
| 2009/0174466 A1 | 7/2009 | Hsieh et al. | |
| 2009/0190699 A1 | 7/2009 | Kazakevich et al. | |
| 2009/0218995 A1 | 9/2009 | Ahn | |
| 2009/0289720 A1 | 11/2009 | Takinami et al. | |
| 2009/0319065 A1 | 12/2009 | Risbo | |
| 2010/0017553 A1 | 1/2010 | Laurencin et al. | |
| 2010/0171553 A1 | 7/2010 | Okubo et al. | |
| 2010/0301947 A1 * | 12/2010 | Fujioka et al. | 330/295 |
| 2010/0308654 A1 | 12/2010 | Chen | |
| 2010/0311365 A1 | 12/2010 | Vinayak et al. | |
| 2010/0321127 A1 | 12/2010 | Watanabe et al. | |
| 2011/0018626 A1 | 1/2011 | Kojima | |
| 2011/0084760 A1 | 4/2011 | Guo et al. | |
| 2011/0148375 A1 | 6/2011 | Tsuji | |
| 2011/0235827 A1 | 9/2011 | Lesso et al. | |
| 2012/0034893 A1 | 2/2012 | Baxter et al. | |
| 2012/0068767 A1 | 3/2012 | Henshaw et al. | |
| 2012/0133299 A1 * | 5/2012 | Capodivacca et al. | 315/297 |
| 2012/0139516 A1 * | 6/2012 | Tsai et al. | 323/282 |
| 2012/0170334 A1 * | 7/2012 | Menegoli et al. | 363/60 |
| 2012/0176196 A1 * | 7/2012 | Khlat | 330/127 |
| 2012/0236444 A1 | 9/2012 | Srivastava et al. | |
| 2012/0299647 A1 | 11/2012 | Honjo et al. | |
| 2013/0034139 A1 | 2/2013 | Khlat et al. | |

FOREIGN PATENT DOCUMENTS

| | | |
|---|---|---|
| EP | 1569330 A1 | 8/2005 |
| EP | 2214304 A1 | 8/2010 |
| EP | 2244366 A1 | 10/2010 |
| GB | 2462204 A | 2/2010 |
| GB | 2465552 A | 5/2010 |
| WO | 0048306 A1 | 8/2000 |
| WO | 2004002006 A1 | 12/2003 |
| WO | 2004082135 A2 | 9/2004 |
| WO | 2005013084 A2 | 2/2005 |
| WO | 2006073208 A1 | 7/2006 |

OTHER PUBLICATIONS

Cidronali, A. et al., "A 240W dual-band 870 and 2140 MHz envelope tracking GaN PA designed by a probability distribution conscious approach," IEEE MTT-S International Microwave Symposium Digest, Jun. 5-10, 2011, 4 pages.

International Search Report for PCT/US2011/061007 mailed Aug. 16, 2012, 16 pages.

(56) References Cited

OTHER PUBLICATIONS

International Search Report for PCT/US2012/024124 mailed Aug. 24, 2012, 14 pages.
International Search Report for US PCT/US2012/036858 mailed Aug. 9, 2012, 7 pages.
International Search Report for US PCT/US2012/036858 mailed Aug. 10, 2012, 8 pages.
International Search Report for PCT/US2012/023495 mailed May 7, 2012, 13 pages.
Hekkala, A. et al., "Adaptive time misalignment compensation in envelope tracking amplifiers," International Symposium on Spread Spectrum Techniques and Applications, Aug. 2008, pp. 761-765.
Invitation to Pay Additional Fees and Where Applicable Protest Fee for PCT/US2012/024124 mailed Jun. 1, 2012, 7 pages.
Dixon, N., "Standardization boosts momentum for Envelope tracking," Microwave Engineers, Europe, Apr. 20, 2011, 2 pages, http://www.mwee.com/en/standardisation-boosts-momentum-for-envelope-tracking.html?cmp_ids=71&news_ids=222901746.
Knutson, P, et al., "An Optimal Approach to Digital Raster Mapper Design," 1991 IEEE International Conference on Consumer Electronics held Jun. 5-7, 1991, vol. 37, Issue 4, published Nov. 1991, pp. 746-752.
Le, Hanh-Phuc et al., "A 32nm Fully Integrated Reconfigurable Switched-Capacitor DC-DC Convertor Delivering $0.55W/mm^2$ at 81% Efficiency," 2010 IEEE International Solid State Circuits Conference, Feb. 20-24, 2010, pp. 210-212.
Sahu, B. et al., "Adaptive Power Management of Linear RF Power Amplifiers in Mobile Handsets—An Integrated System Design Approach," submission for IEEE Asia Pacific Microwave Conference, Mar. 2004, 4 pages.
Unknown, "Nujira files 100th envelope tracking patent," CS: Compound Semiconductor, Apr. 11, 2011, 1 page.
Non-final Office Action for U.S. Appl. No. 12/112,006 mailed Apr. 5, 2010, 6 pages.
Notice of Allowance for U.S. Appl. No. 12/112,006 mailed Jul. 19, 2010, 6 pages.
International Search Report for PCT/US11/033037 mailed Aug. 9, 2011, 10 pages.
International Search Report for PCT/US2011/044857 mailed Oct. 24, 2011, 10 pages.
International Search Report for PCT/US11/49243 mailed Dec. 22, 2011, 9 pages.
Non-final Office Action for U.S. Appl. No. 11/113,873, now Patent No. 7,773,691 mailed Feb. 1, 2008, 17 pages.
Final Office Action for U.S. Appl. No. 11/113,873, now Patent No. 7,773,691, mailed Jul. 30, 2008, 19 pages.
Non-final Office Action for U.S. Appl. No. 11/113,873, now Patent No. 7,773,691, mailed Nov. 26, 2008, 22 pages.
Final Office Action for U.S. Appl. No. 11/113,873, now Patent No. 7,773,691, mailed May 4, 2009, 20 pages.
Non-final Office Action for U.S. Appl. No. 11/113,873, now Patent No. 7,773,691, mailed Feb. 3, 2010, 21 pages.
Notice of Allowance for U.S. Appl. No. 11/113,873, now Patent No. 7,773,691, mailed Jun. 9, 2010, 7 pages.
Kim, N. et al, "Ripple feedback filter suitable for analog/digital mixed-mode audio amplifier for improved efficiency and stability," Power Electronics Specialists Conference, vol. 1, Jun. 23, 2002, pp. 45-49.
International Search Report for PCT/US06/12619 mailed May 8, 2007, 2 pages.
International Search Report for PCT/US2011/061009 mailed Feb. 8, 2012, 14 pages.
Invitation to Pay Additional Fees and Where Applicable Protest Fee for PCT/US2011/061007 mailed Feb. 13, 2012, 7 pages.
Kim et al., "High Efficiency and Wideband Envelope Tracking Power Amplifiers with Sweet Spot Tracking," 2010 IEEE Radio Frequency Integrated Circuits Symposium, May 23-25, 2010, pp. 255-258.
International Search Report for PCT/US2011/064255 mailed Apr. 3, 2012, 12 pages.
Extended European Search Report for application 06740532.4 mailed Dec. 7, 2010, 7 pages.
Choi, J. et al., "A New Power Management IC Architecture for Envelope Tracking Power Amplifier," IEEE Transactions on Microwave Theory and Techniques, vol. 59, No. 7, Jul. 2011, pp. 1796-1802.
Non-final Office Action for U.S. Appl. No. 13/218,400 mailed Nov. 8, 2012, 7 pages.
Notice of Allowance for U.S. Appl. No. 13/316,229 mailed Nov. 14, 2012, 9 pages.
Non-final Office Action for U.S. Appl. No. 13/222,484 mailed Nov. 8, 2012, 9 pages.
Non-final Office Action for U.S. Appl. No. 13/089,917 mailed Nov. 23, 2012, 6 pages.
International Preliminary Report on Patentability for PCT/US11/49243 mailed Nov. 13, 2012, 33 pages.
International Preliminary Report on Patentability for PCT/US2011/033037 mailed Oct. 23, 2012, 7 pages.
Non-Final Office Action for U.S. Appl. No. 13/188,024, mailed Feb. 5, 2013, 8 pages.
International Preliminary Report on Patentability for PCT/US2011/044857 mailed Mar. 7, 2013, 6 pages.
Notice of Allowance for U.S. Appl. No. 13/218,400 mailed Apr. 11, 2013, 7 pages.
International Search Report for PCT/US2011/054106 mailed Feb. 9, 2012, 11 pages.
Non-Final Office Action for U.S. Appl. No. 13/297,470 mailed May 8, 2013, 15 pages.
International Search Report for PCT/US2012/40317 mailed Sep. 7, 2012, 7 pages.
International Search Report for PCT/US2012/046887 mailed Dec. 21, 2012, 12 pages.
Final Office Action for U.S. Appl. No. 13/222,484 mailed Apr. 10, 2013, 10 pages.
International Search Report and Written Opinion for PCT/US2012/053654 mailed Feb. 15, 2013, 11 pages.
International Search Report and Written Opinion for PCT/US2012/062070, mailed Jan. 21, 2013, 12 pages.
International Search Report and Written Opinion for PCT/US2012/067230 mailed Feb. 21, 2013, 10 pages.
Notice of Allowance for U.S. Appl. No. 13/188,024, mailed Jun. 18, 2013, 8 pages.
International Preliminary Report on Patentability for PCT/US2011/054106 mailed Apr. 11, 2013, 8 pages.
International Preliminary Report on Patentability for PCT/US2011/061007 mailed May 30, 2013, 11 pages.
International Preliminary Report on Patentability for PCT/US2011/061009 mailed May 30, 2013, 10 pages.
Non-Final Office Action for U.S. Appl. No. 13/423,649, mailed May 22, 2013, 7 pages.
Advisory Action for U.S. Appl. No. 13/222,484, mailed Jun. 14, 2013, 3 pages.
International Preliminary Report on Patentability for PCT/US2011/064255, mailed Jun. 20, 2013, 7 pages.
Notice of Allowance for U.S. Appl. No. 13/343,840, mailed Jul. 1, 2013, 8 pages.
Lie, Donald Y.C. et al., "Design of Highly-Efficient Wideband RF Polar Transmitters Using Envelope-Tracking (ET) for Mobile WiMAX/Wibro Applications," IEEE 8th International Conference on ASIC (ASCION), Oct. 20-23, 2009, pp. 347-350.
Lie, Donald Y.C. et al., "Highly Efficient and Linear Class E SiGe Power Amplifier Design," 8th International Conference on Solid-State and Integrated Circuit Technology (ICSICT), Oct. 23-26, 2006, pp. 1526-1529.
Notice of Allowance for U.S. Appl. No. 13/222,484, mailed Aug. 26, 2013, 8 pages.
Notice of Allowance for U.S. Appl. No. 13/222,453, mailed Aug. 22, 2013, 8 pages.
Non-Final Office Action for U.S. Appl. No. 13/367,973, mailed Sep. 24, 2013, 8 pages.
Notice of Allowance for U.S. Appl. No. 13/602,856, mailed Sep. 24, 2013, 9 pages.

(56) References Cited

OTHER PUBLICATIONS

Notice of Allowance for U.S. Appl. No. 13/316,229, mailed Aug. 29, 2013, 8 pages.
Quayle Action for U.S. Appl. No. 13/531,719, mailed Oct. 10, 2013, 5 pages.
Notice of Allowance for U.S. Appl. No. 13/550,060, mailed Aug. 16, 2013, 8 pages.
Notice of Allowance for U.S. Appl. No. 13/363,888, mailed Jul. 18, 2013, 9 pages.
Notice of Allowance for U.S. Appl. No. 13/423,649, mailed Aug. 30, 2013, 8 pages.
International Preliminary Report on Patentability for PCT/US2012/024124, mailed Aug. 22, 2013, 8 pages.
International Preliminary Report on Patentability for PCT/US2012/023495, mailed Aug. 15, 2013, 10 pages.
Non-Final Office Action for U.S. Appl. No. 12/836,307, mailed Nov. 5, 2013, 6 pages.
Final Office Action for U.S. Appl. No. 13/297,470, mailed Oct. 25, 2013, 17 pages.
Notice of Allowance for U.S. Appl. No. 14/022,858, mailed Oct. 25, 2013, 9 pages.

\* cited by examiner

SINGLE CHARGE-PUMP BUCK-BOOST FOR PROVIDING INDEPENDENT VOLTAGES

RELATED APPLICATIONS

This application claims the benefit of U.S. provisional patent application No. 61/524,482 filed Aug. 17, 2011, the disclosure of which is incorporated herein by reference in its entirety. This application is also related to a concurrently filed utility application entitled CHARGE-PUMP SYSTEM FOR PROVIDING INDEPENDENT VOLTAGES, the disclosure of which is incorporated herein by reference in its entirety.

FIELD OF THE DISCLOSURE

Embodiments of the present disclosure relate to charge-pumps that provide more than one output voltage.

BACKGROUND

Future mobile terminals such as smart phones and tablet computers will require simultaneous transmission of signals on two different frequencies that are referred to as multi-carriers. A relatively large bandwidth for the multi-carriers is on the order of 20 MHz each. A separate power amplifier (PA) is needed for each of the multi-carriers. FIG. 1 is a schematic for a related art dual charge-pump converter 10 that is usable to supply power to a first power amplifier (PA) 12 and a second PA 14. The related art dual charge-pump converter 10 includes a first charge pump CP#1 and a second charge pump CP#2 that present a disadvantage in that relatively expensive and area consuming components are duplicated for each of the first PA 12 and the second PA 14.

FIG. 2 is a circuit diagram for a related art charge pump 16 of the single phase type. The charge pump 16 includes a capacitor C1 having a first electrode 18 and a second electrode 20. A first switch SW1 has a first terminal 22 coupled to a high voltage node 24, a second terminal 26 coupled to the first electrode 18 of the capacitor C1, and a control terminal 28 for receiving a first control signal S1. A second switch SW2 has a first terminal 30 coupled to the first electrode 18 of the capacitor C1, a second terminal 32 that is adapted to be an output LX, and a control terminal 34 for receiving a second control signal S2. A third switch SW3 has a first terminal 36 coupled to the high voltage node 24, a second terminal 38 coupled to the second electrode 20 of the capacitor C1, and a control terminal 40 for receiving a control signal S3. A fourth switch SW4 has a first terminal 42 coupled to the second electrode 20 of the capacitor C1, a second terminal 44 coupled to a low voltage node 46, and a control terminal 48 for receiving a fourth control signal S4. The high voltage node 24 is typically held at a battery voltage $V_{BAT}$, while the low voltage node 46 is typically at ground potential.

FIG. 3 is a timing diagram for the control signals S1, S2, S3 and S4 needed for the related art charge pump 16 to output a voltage at the output LX. The timing diagram begins at a time t0 with the control signals S1 and S4 at logic low (L) and the control signals S2 and S3 at logic high (H). As a result, the first switch SW1 and the fourth switch SW4 are non-conducting while the second switch SW2 and the third switch SW3 are conducting. Thus, the voltage $V_{BAT}$ is applied to the second electrode 20 of the capacitor C1 while the first electrode 18 of the capacitor C1 is effectively coupled to the output LX. Therefore, assuming that the capacitor C1 is charged to the voltage $V_{BAT}$ from a previous cycle, the voltage at the output LX will be two times $V_{BAT}$.

After a predetermined time t1, the control signals S1 and S4 transition to logic high while the control signals S2 and S3 transition to logic low. At this point, the first switch SW1 and the fourth switch SW4 are conducting while the second switch SW2 and the third switch SW3 are non-conducting. In this way, the first electrode 18 of the capacitor C1 is effectively coupled to the high voltage node 24 and the second electrode 20 of the capacitor C1 is effectively coupled to the low voltage node 46. As a result, the capacitor C1 is charged to the value of $V_{BAT}$, which is the voltage applied to the high voltage node 24. After a predetermined time t2 of charging, a new cycle begins by transitioning the control signals S1 and S4 from logic high back to logic low while the control signals S2 and S3 transition from logic low back to logic high.

FIG. 4 is a circuit diagram for a related art dual phase charge pump 50. The dual phase charge pump 50 combines the charge pump 16 with a charge pump 52. The charge pump 52 includes a capacitor C2 having a first electrode 54 and a second electrode 56. A fifth switch SW5 has a first terminal 58 coupled to the high voltage node 24, a second terminal 60 coupled to the first electrode 54 of the capacitor C2, and a control terminal 62 for receiving a fifth control signal S5. A sixth switch SW6 has a first terminal 64 coupled to the first electrode 54 of the capacitor C2, a second terminal 66 coupled to the output LX, and a control terminal 68 for receiving control signal S6. A seventh switch SW7 has a first terminal 70 coupled to the high voltage node 24, a second terminal 72 coupled to the second electrode 56 of the capacitor C2, and a control terminal 74 for receiving a control signal S7. An eighth switch SW8 has a first terminal 76 coupled to the second electrode 56 of the capacitor C2, a second terminal 78 coupled to the low voltage node 46, and a control terminal 80 for receiving a control signal S8.

FIG. 5 is a timing diagram for the control signals S1 through S8 needed for the related art charge pump 50 (FIG. 4) to output a voltage at the output LX. The timing diagram begins a cycle at time t0 with the control signals S1, S4, S6, and S7 at logic low (L) and the control signals S2, S3, S5, and S8 at logic high (H). Thus, the first switch SW1 and the fourth switch SW4 are non-conducting while the second switch SW2 and the third switch SW3 are conducting. As a result, the voltage $V_{BAT}$ is applied to the second electrode 20 of the capacitor C1 while the first electrode 18 of the capacitor C1 is effectively coupled to the output LX. Therefore, assuming that the capacitor C1 is charged to the voltage $V_{BAT}$ from a previous cycle, the voltage level at the output LX will be at a voltage level that is two times $V_{BAT}$. Moreover, the fifth switch SW5 and the eighth switch SW8 are conducting while the sixth switch SW6 and the seventh switch SW7 are non-conducting. As a result, the first electrode 54 of the second capacitor C2 is effectively coupled to the high voltage node 24, while the second electrode 56 is effectively coupled to the low voltage node 46. In this way, the second capacitor C2 is charging to the voltage $V_{BAT}$ while the first capacitor C1 is discharging.

At a first predetermined time t1, the control signals S2 and S2 transition to logic low. As a result, the second switch SW2 and the third switch SW3 become non-conducting. The second terminal 32 of the second switch SW2 is left floating as shown with an exponentially decaying dashed line between pulses of voltage at the LX node. Simultaneously, the control signals S1 and S4 transition to a logic high. In this way, the first electrode 18 of the first capacitor C1 will be effectively coupled to the high voltage node 24 and the second electrode 20 will be effectively coupled to the low voltage node 46. As a result, the first capacitor C1 begins charging to the voltage $V_{BAT}$.

At a second predetermined time t2, the control signals S5 and S8 transition to logic low. In this way, the switches SW5 and SW8 become non-conducting. Simultaneously, the control signals S6 and S7 transition to logic high. As a result, the voltage $V_{BAT}$ is applied to the second electrode 56 of the capacitor C2 while the first electrode 54 of the capacitor C2 is effectively coupled to the output LX. Therefore, assuming that the capacitor C2 is charged to the voltage $V_{BAT}$, the voltage level at the output LX will be at a voltage level that is two times $V_{BAT}$. The cycle repeats at a third predetermined time t3.

The related art charge pump 16 (FIG. 2) and the related art charge pump 50 (FIG. 4) are both suitable as the first charge pump CP#1 (FIG. 1) and the second charge pump CP#2 (FIG. 2) for the related art dual charge-pump converter 10. However, neither the related art charge pump 16 nor the related art charge pump 50 can alone replace the related art dual charge-pump converter 10. What is needed is a single charge pump that generates independent voltage levels thereby fulfilling the role of the related art dual charge-pump converter 10.

SUMMARY

The present disclosure provides a charge pump that generates independent voltage levels from independent voltage pulses. The disclosed charge pump as a single unit is suitable as a replacement for the related art dual charge-pump converter 10 (FIG. 1). The disclosed charge pump includes a first output, a second output and at least one capacitor. A plurality of switches are coupled to the at least one capacitor for selectively coupling the at least one capacitor between a high voltage node and a low voltage node and for selectively coupling the at least one capacitor to the first output and the second output. A switch controller is adapted to generate control signals for the plurality of switches to selectively couple the at least one capacitor between the high voltage node and the low voltage node during charging phases, and to selectively couple the at least one capacitor to the first output and the second output during discharging phases that output a first voltage pulse from the first output and a second voltage pulse from the second output such that the first voltage pulse and the second voltage pulse are asymmetrical and coincidental. For example, in at least one embodiment, the duration of the first voltage pulse is asymmetrical with the duration of the second voltage pulse. In at least one embodiment, the first voltage pulse and the second voltage pulse are asymmetrical because they have unequal pulse widths. Further still, the first voltage pulse and the second voltage pulse are coincidental in that the second pulse occurs within a same time frame as the first voltage pulse.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
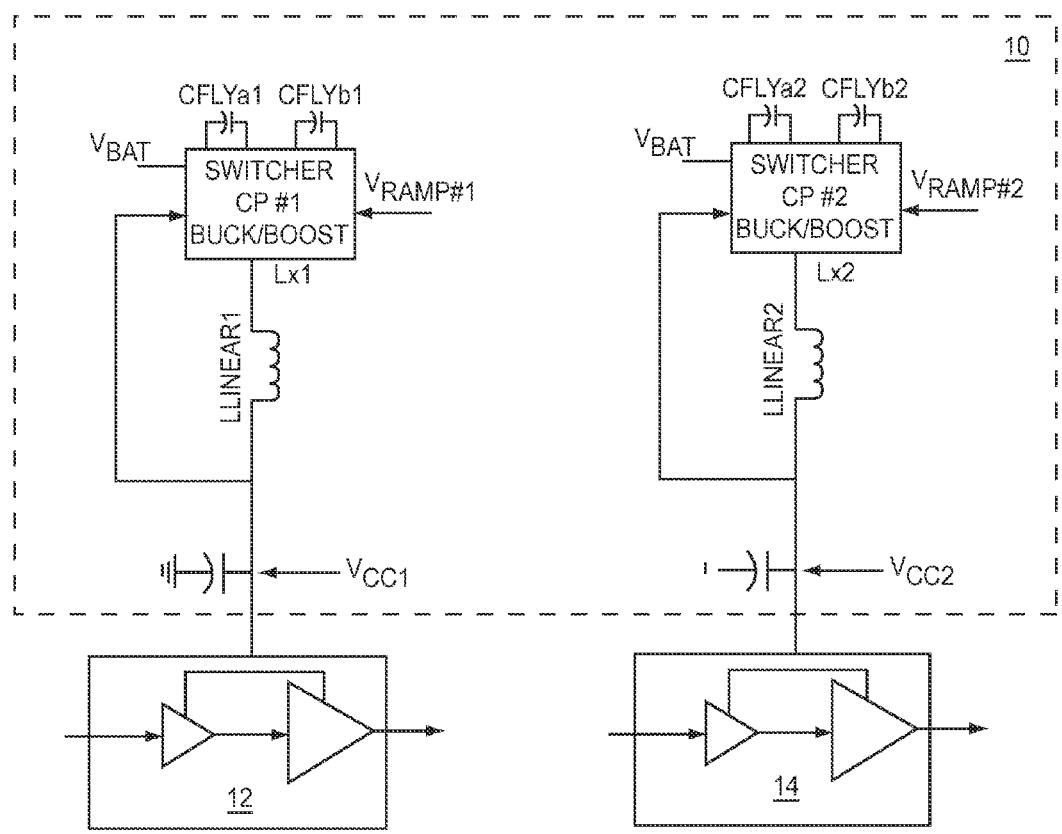
FIG. 1 is a schematic for a related art dual charge-pump converter that is usable to supply power to a first power amplifier (PA) and a second PA.
Figure 2:
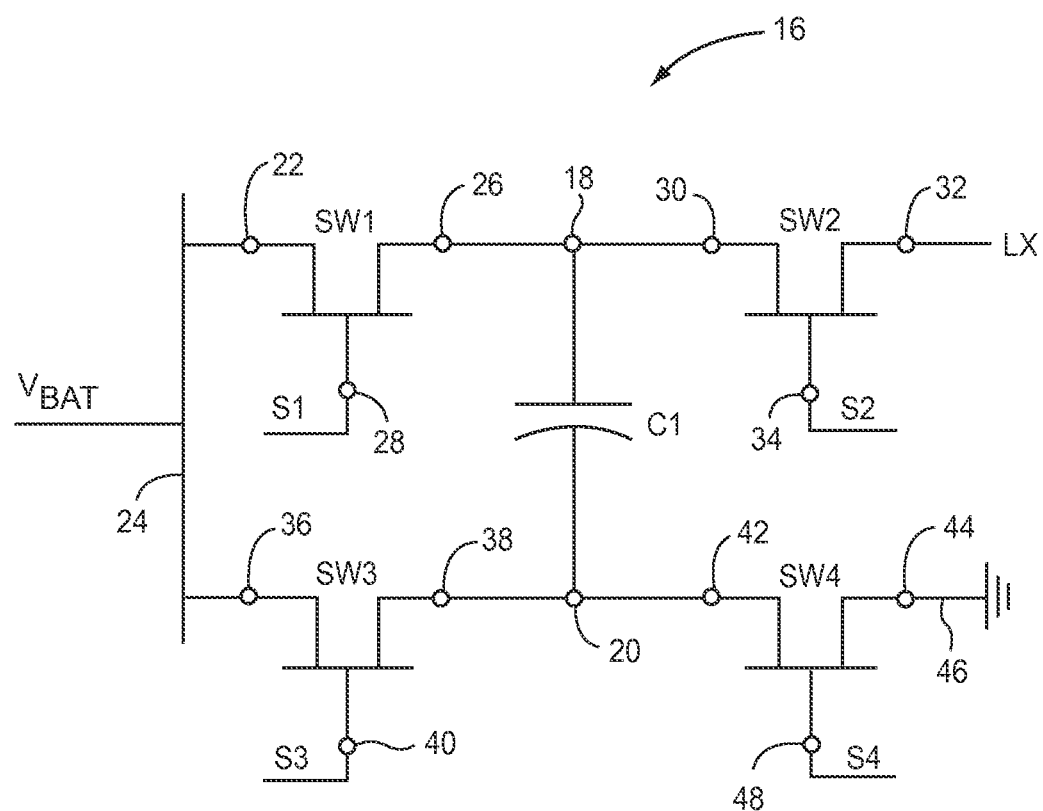
FIG. 2 is a schematic for a related art single phase charge pump.
Figure 3:
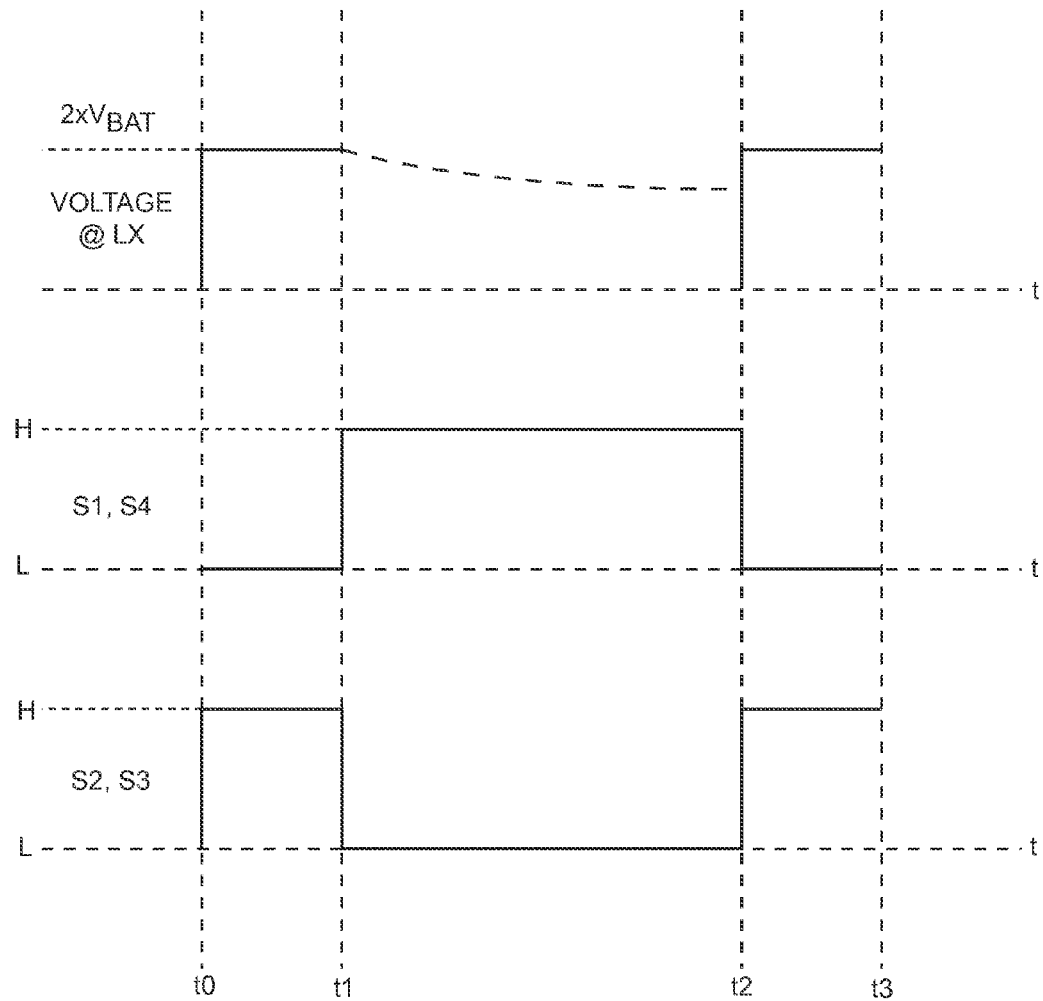
FIG. 3 is a timing diagram for the control signals needed for the related art charge pump of FIG. 2 to output a voltage.
Figure 4:
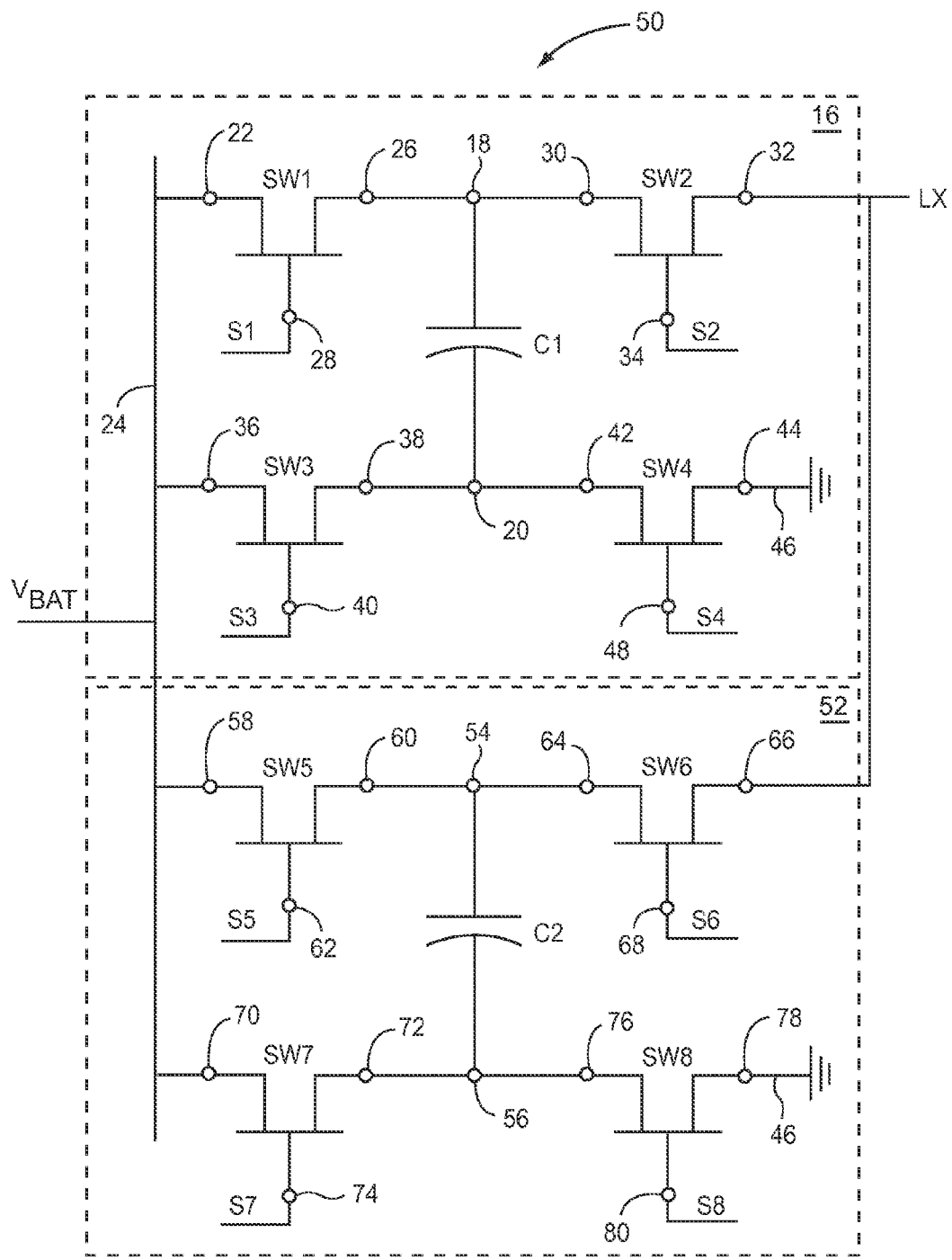
FIG. 4 is a schematic of a related art charge pump of the dual phase type.
Figure 5:
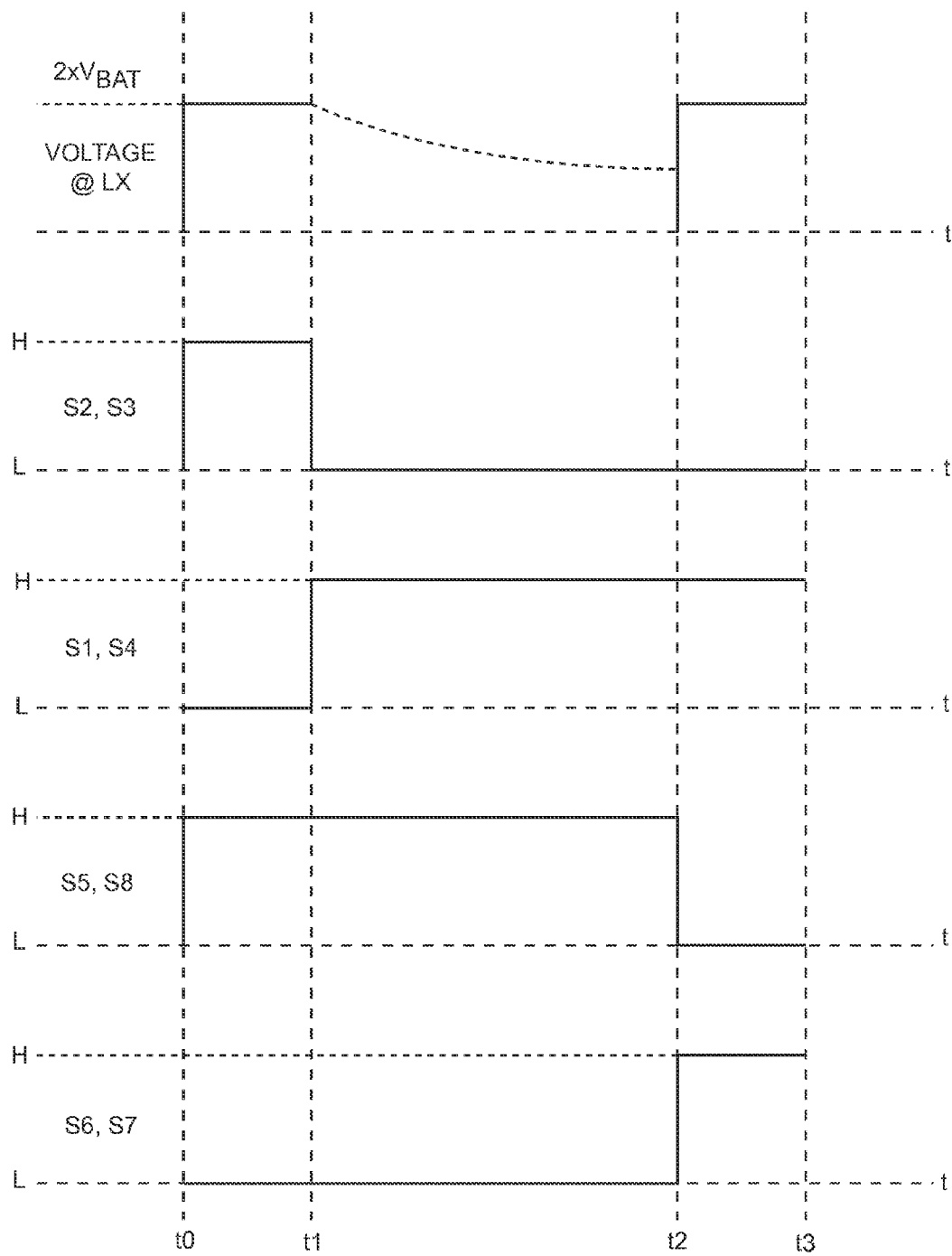
FIG. 5 is a timing diagram for the control signals needed for the related art charge pump of FIG. 4 to output a voltage.
Figure 6:
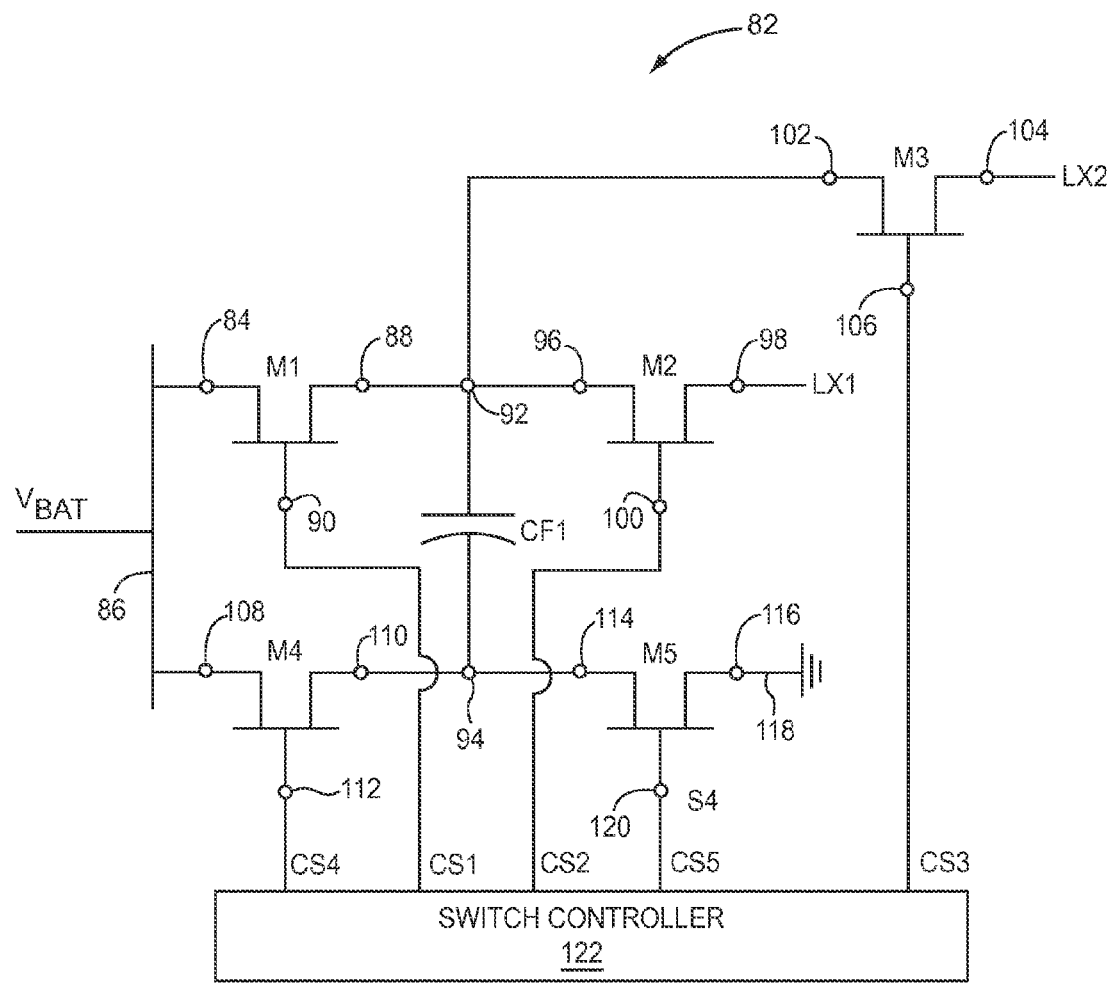
FIG. 6 is a schematic of a charge pump that provides independent voltage levels according to the present disclosure.

FIG. 6 is a schematic of a charge pump 82 that provides independent voltage levels according to the present disclosure. The charge pump 82 includes a first switch M1 having a first terminal 84 coupled to a high voltage node 86, a second terminal 88, and a control terminal 90 for receiving a first control signal CS1. A first capacitor CF1 having a first electrode 92 and a second electrode 94 is coupled to the second terminal 88 of the first switch M1 via the first electrode 92. A second switch M2 has a first terminal 96 coupled to the first electrode 92 of the first capacitor CF1, a second terminal 98 adapted to be a first output LX1, and a control terminal 100 for receiving a second control signal CS2. A third switch M3 has a first terminal 102 coupled to the first electrode 92 of the first capacitor CF1, a second terminal 104 adapted to be a second output LX2, and a control terminal 106 for receiving a third control signal CS3. A fourth switch M4 has a first terminal 108 coupled to the high voltage node 86, a second terminal 110 coupled to the second electrode 94 of the first capacitor CF1, and a control terminal 112 for receiving a fourth control signal CS4. A fifth switch M5 has a first terminal 114 coupled to the second electrode 94 of the first capacitor CF1, a second terminal 116 coupled to a low voltage node 118, and a control terminal 120 for receiving a fifth control signal CS5. A switch controller 122 is adapted to generate the first control signal CS1, the second control signal CS2, the third control signal CS3, the fourth control signal CS4 and the fifth control signal CS5 such that a first voltage pulse output from the second terminal 98 of the second switch M2 and a second voltage pulse output from the second terminal 104 of the third switch M3 are asymmetrical and coincidental. In at least one embodiment, the duration of the first voltage pulse is asymmetrical with the duration of the second voltage pulse. For example, the pulse duration of the first voltage pulse could be twice the duration of the second voltage pulse. Further still, in this example, the first voltage pulse and the second voltage pulse are coincidental in that the second pulse occurs within a same time frame as the first voltage pulse or vice versa. It should also be understood that the charge pump 82 can couple with a charge pump system comprising N charge pumps that operate with N phases.

Figure 7:
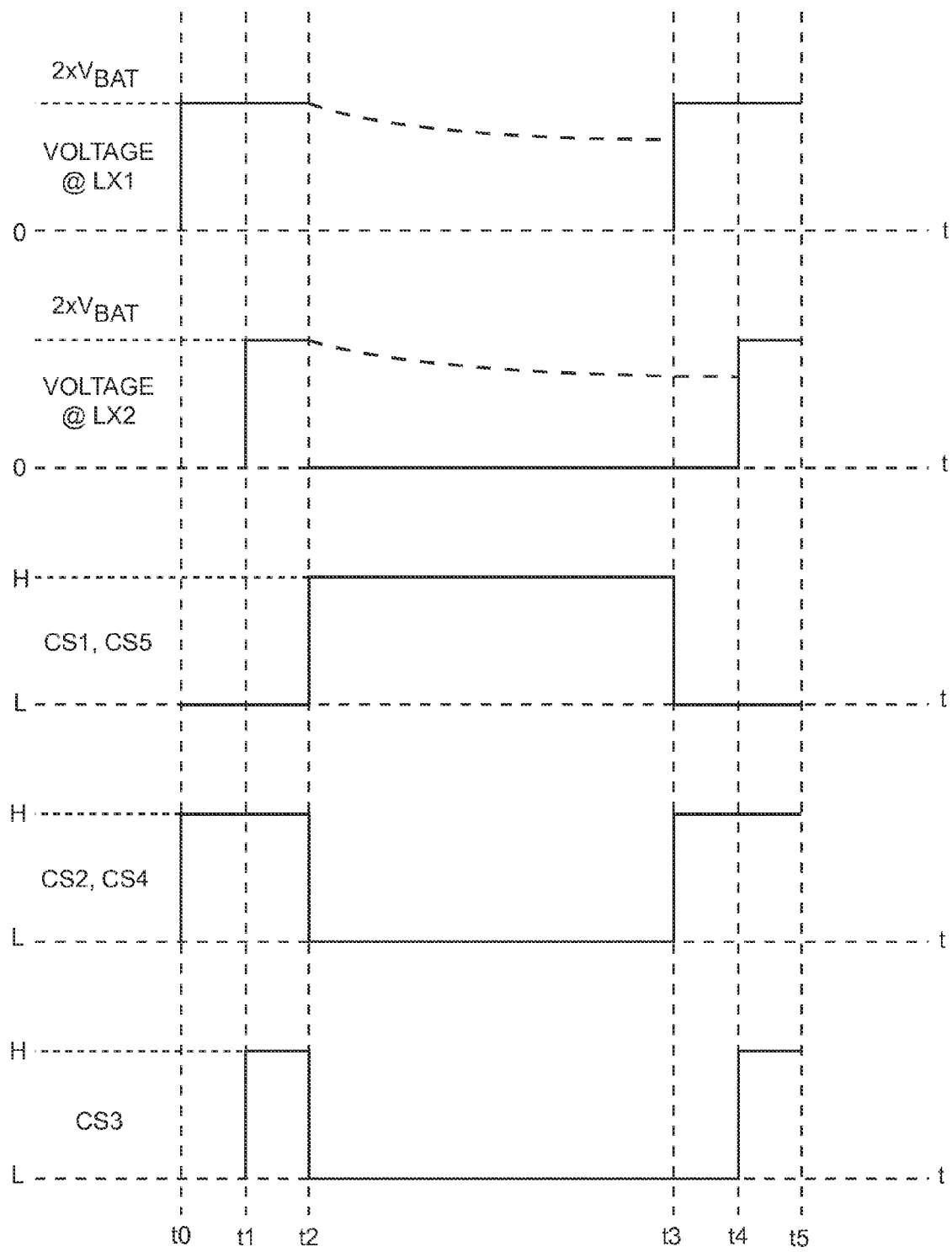
FIG. 7 is a first timing diagram for control signals needed for the charge pump of FIG. 6 to output a first voltage and a second voltage.

FIG. 7 is a first timing diagram for the control signals CS1 through CS5 needed for the charge pump 82 (FIG. 6) to output a first voltage at the first output LX1 and a second voltage at the second output LX2. The timing diagram begins a cycle at time t0 with the control signals CS1, CS5, and CS3 at logic low (L) while the control signals CS2 and CS4 are at logic high (H). Thus, the first switch M1, the third switch M3, and the fifth switch M5 are non-conducting while the second switch M2 and the fourth switch M4 are conducting. As a result, a voltage $V_{BAT}$ is applied to the second electrode 94 of the first capacitor CF1 while the first electrode 92 of the first capacitor CF1 is effectively coupled to the first output LX1. Therefore, assuming that the first capacitor CF1 is charged to the voltage $V_{BAT}$ from a previous cycle, a voltage level at the first output LX1 will be at a voltage level that is two times $V_{BAT}$. At first time period t1, the control signal CS3 transitions to a logic high (H) thereby making the third switch M3 conduct. As a result, the first electrode 92 of the first capacitor CF1 is effectively coupled to the second output LX2. Therefore, assuming that the first capacitor CF1 has not discharged much from the voltage $V_{BAT}$, the voltage level at the second output LX2 will be at a voltage level that is near two times $V_{BAT}$.

After a second predetermined time t2, the control signals CS2, CS3 and CS4 transition to logic low (L) while the control signals CS1 and CS5 transition to logic high (H). At this point, the first switch M1 and the fifth switch M5 are conducting while the second switch M2, the third switch M3, and the fourth switch M4 are non-conducting. In this way, the first electrode 92 of the first capacitor CF1 is effectively coupled to the high voltage node 86 and the second electrode 94 of the first capacitor CF1 is effectively coupled to the low voltage node 118. As a result, the first capacitor CF1 is charged to the value of $V_{BAT}$, which is the voltage level applied to the high voltage node 86. Simultaneously, the second terminal 98 of the second switch M2 and the second terminal 104 of the third switch M3 are left floating as shown with exponentially decaying dashed lines between pulses of voltage at the LX1 node and the LX2 nodes. After a third predetermined time t3, the cycle repeats.

Figure 8:
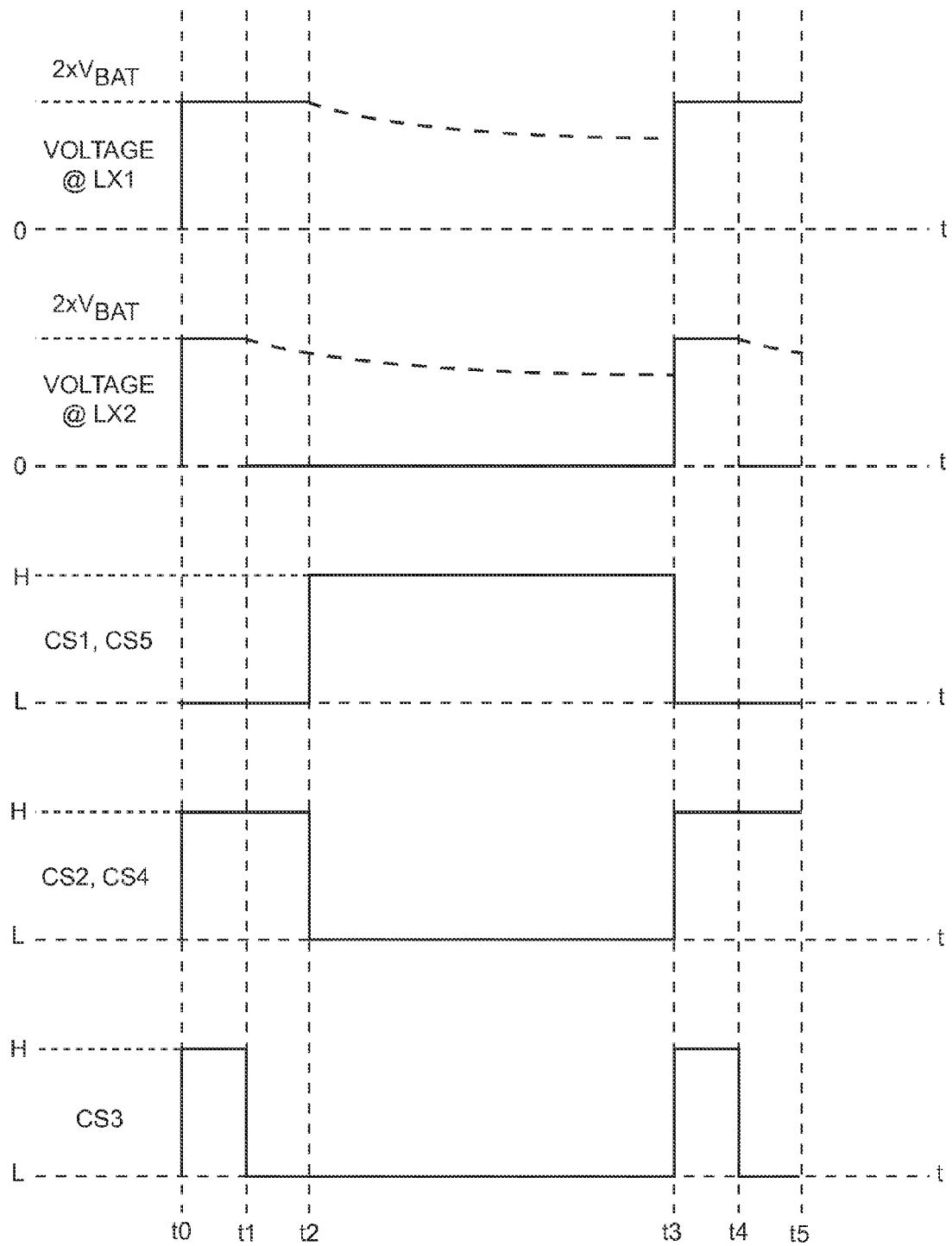
FIG. 8 is a second timing diagram for control signals needed for the charge pump of FIG. 6 to output a first voltage and the second voltage.

FIG. 8 is a second timing diagram for the control signals CS1 through CS5 needed for the charge pump 82 (FIG. 6) to output a first voltage at the first output LX1 and a second voltage at the second output LX2. The timing diagram begins a cycle at time t0 with the control signals CS1 and CS5 at logic low (L) while the control signals CS2, CS3, and CS4 are at logic high (H). Thus, the first switch M1 and the fifth switch M5 are non-conducting while the second switch M2, the third switch M3, and the fourth switch M4 are conducting. As a result, the voltage $V_{BAT}$ is applied to the second electrode 94 of the first capacitor CF1 while the first electrode 92 of the first capacitor CF1 is effectively coupled to the first output LX1 and the second output LX2. Therefore, assuming the first capacitor CF1 is charged to the voltage $V_{BAT}$ from a previous cycle, the voltage level at the first output LX1 and the second output LX2 will be at a voltage level that is two times $V_{BAT}$. After a first predetermined time t1, the control signal CS3 transitions to logic low (L) to float the second terminal 104 of the third switch M3. The floating condition is represented by an exponentially decaying line between the voltage pulses at the LX2 node.

After a second predetermined time t2, the control signals CS2 and CS4 transition to logic low (L) while the control signals CS1 and CS5 transition to logic high (H). At this point, the first switch M1 and the fifth switch M5 are conducting while the second switch M2 and the fourth switch M4 are non-conducting. In this way, the first electrode 92 of the first capacitor CF1 is effectively coupled to the high voltage node 86 and the second electrode 94 of the first capacitor CF1 is effectively coupled to the low voltage node 118. As a result, the first capacitor CF1 is charged to the value of $V_{BAT}$, which is the voltage level applied to the high voltage node 86. Simultaneously, the second terminal 98 of the switch M2 begins a floating condition as represented by an exponentially decaying line between the voltage pulses at the LX1 node. After a third predetermined time t3, the cycle repeats.

Figure 9:
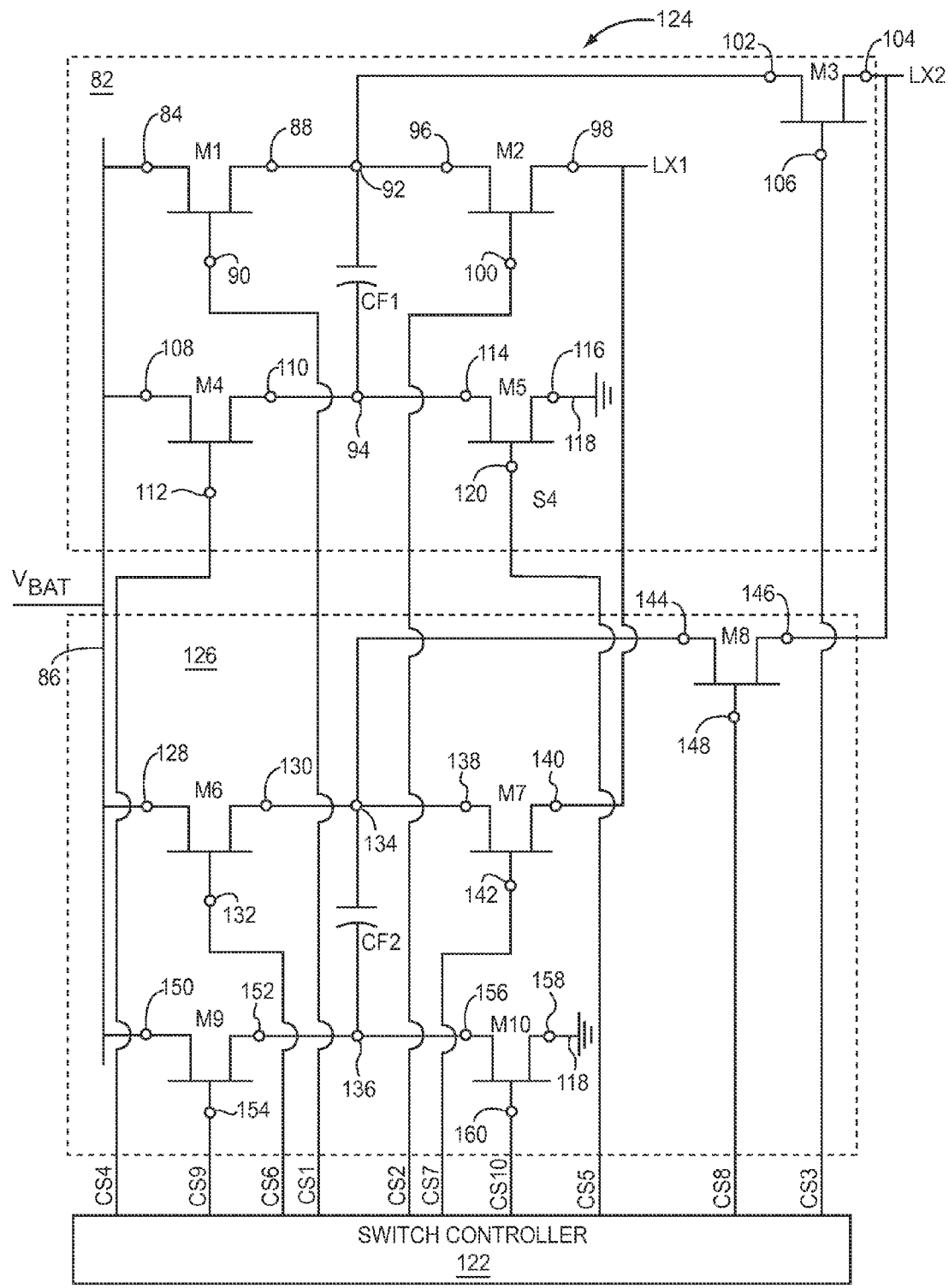
FIG. 9 is a circuit diagram for a dual phase charge pump according to the present disclosure.

FIG. 9 is a circuit diagram for a dual phase charge pump 124 according to the present disclosure. The dual phase charge pump 124 combines the charge pump 82 with a second charge pump 126. The second charge pump 126 includes a sixth switch M6 having a first terminal 128 coupled to the high voltage node 86, a second terminal 130, and a control terminal 132 for receiving a sixth control signal CS6. A capacitor CF2 having a first electrode 134 and a second electrode 136 is coupled to the second terminal 130 of the sixth switch M6 via the first electrode 134. A seventh switch M7 has a first terminal 138 coupled to the first electrode 134 of the capacitor CF2, a second terminal 140 coupled to the first output LX1, and a control terminal 142 for receiving a seventh control signal CS7. An eighth switch M8 has a first terminal 144 coupled to the first electrode 134 of the capacitor CF2, a second terminal 146 coupled to the second output LX2, and a control terminal 148 for receiving an eighth control signal CS8. A ninth switch M9 has a first terminal 150 coupled to the high voltage node 86, a second terminal 152 coupled to the second electrode 136 of the capacitor CF2, and a control terminal 154 for receiving a ninth control signal CS9. A tenth switch M10 has a first terminal 156 coupled to the second electrode 136 of the capacitor CF2, a second terminal 158 coupled to the low voltage node 118, and a control terminal 160 for receiving a tenth control signal CS10. The dual phase charge pump 124 can be adapted into a charge pump system comprising N charge pumps that operate with N phases.

Figure 10A:
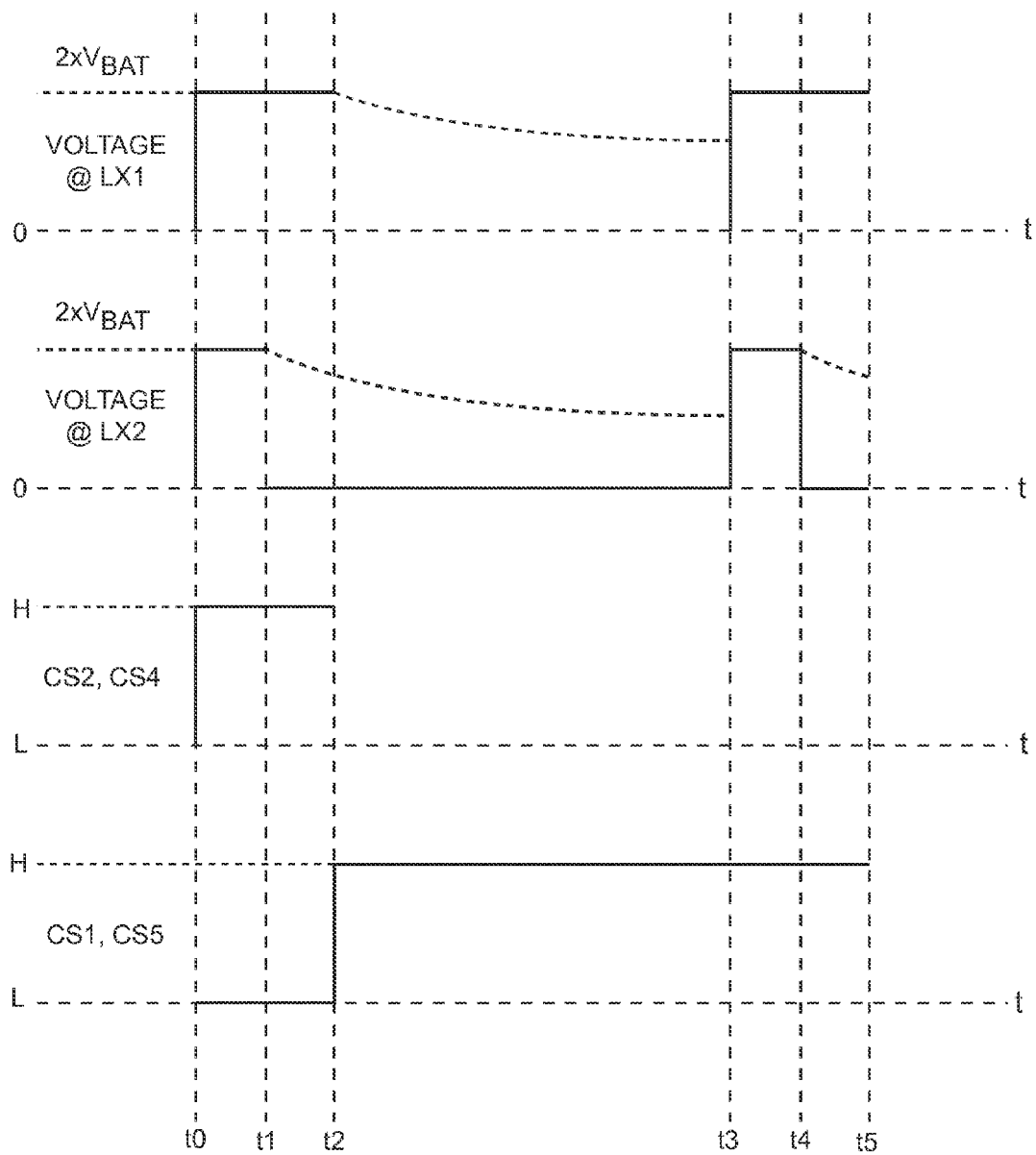
FIGS. 10A and 10B represent a timing diagram for the operation of the dual phase charge pump according to the present disclosure.
Figure 10B:
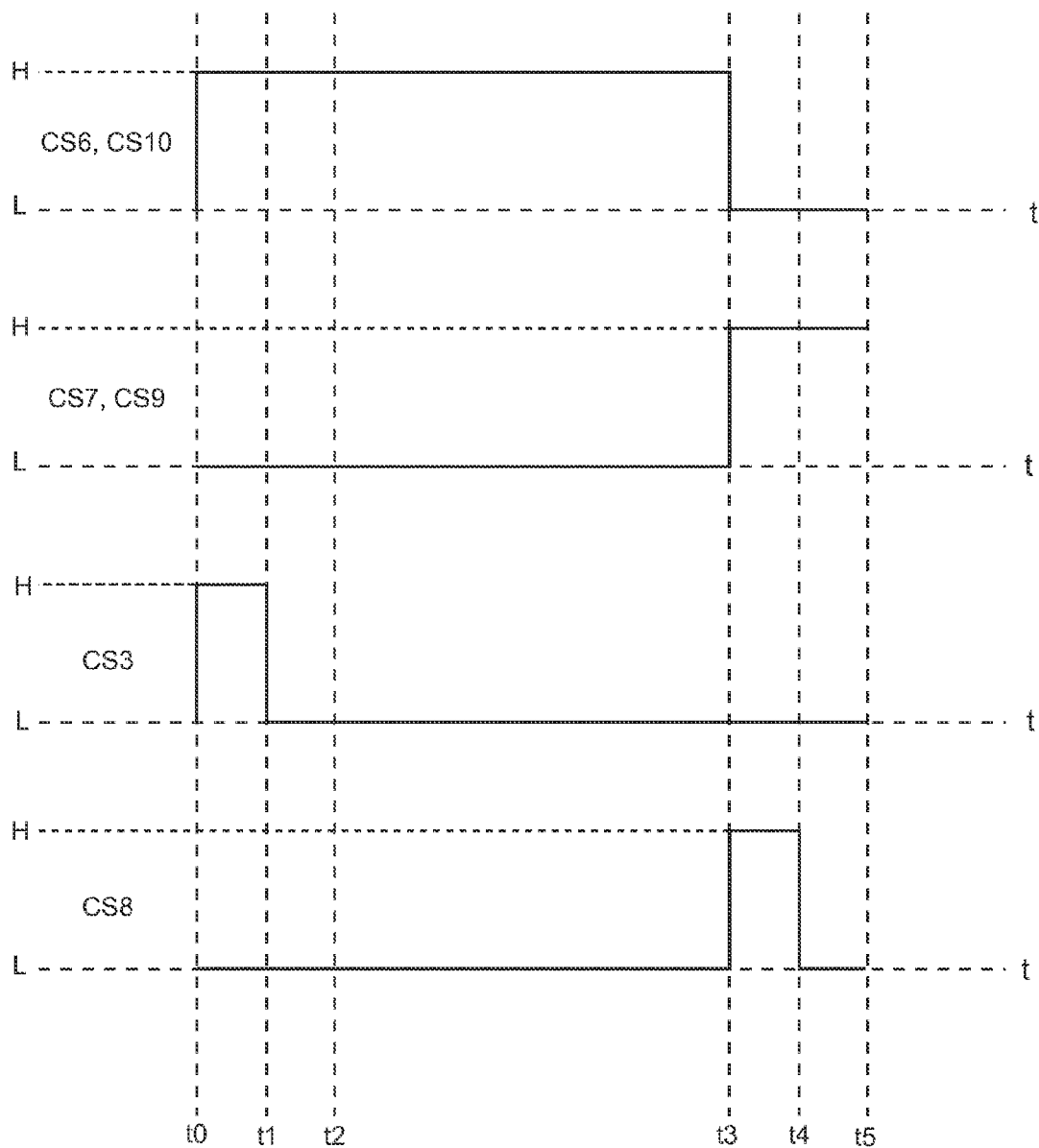

FIGS. 10A and 10B represent a timing diagram for the control signals CS1 through CS10 needed for the dual phase charge pump 124 (FIG. 9) to output a first voltage at the first output LX1 and a second voltage at the second output LX2. The timing diagram begins a cycle at time t0 with the control signals CS1, CS5, CS7, CS8, and CS9 at logic low (L) and the control signals CS2, CS3, CS4, CS6, and CS10 at logic high (H). Thus, the first switch M1 and the fifth switch M5 are non-conducting while the second switch M2, the third switch M3, and the fourth switch M4 are conducting. As a result, the voltage $V_{BAT}$ is applied to the second electrode 94 of the first capacitor CF1 while the first electrode 92 of the first capacitor CF1 is effectively coupled to the first output LX1 and the second output LX2. Therefore, assuming that the first capacitor CF1 is charged to the voltage $V_{BAT}$ from a previous cycle, the first voltage level at the first output LX1 and the second voltage level at the second output LX2 will each be at a voltage level that is two times $V_{BAT}$. Moreover, the sixth switch M6 and the tenth switch M10 are conducting while the seventh switch M7, the eighth switch M8, and the ninth switch M9 are non-conducting. As a result, the first electrode 134 of the second capacitor CF2 is effectively coupled to the high voltage node 86, while the second electrode 136 is effectively coupled to the low voltage node 118. In this way, the second capacitor CF2 is charging to the voltage $V_{BAT}$ while the first capacitor CF1 is discharging.

After a first predetermined time t1, the control signal CS3 transitions to logic low (L) to float the second terminal 104 of the third switch M3. The floating condition is represented by an exponentially decaying line between the voltage pulses at the LX2 node. After a second predetermined time t2, the control signals CS2 and CS4 transition to logic low (L) while the control signals CS1 and CS5 transition to logic high (H). At this point, the first switch M1 and the fifth switch M5 are conducting while the second switch M2 and the fourth switch M4 are non-conducting. In this way, the first electrode 92 of the first capacitor CF1 is effectively coupled to the high voltage node 86 and the second electrode 94 of the first capacitor CF1 is effectively coupled to the low voltage node 118. As a result, the first capacitor CF1 is charged to the value of $V_{BAT}$, which is the voltage applied to the high voltage node 86. Simultaneously, the second terminal 98 is left floating. The floating condition is represented by an exponentially decaying line between the voltage pulses at the LX1 node.

After a third predetermined time t3, the control signals CS6 and CS10 transition to logic low (L) while the control signals CS7, CS8 and CS9 transition to logic high (H). As a result, the sixth switch M6 and the tenth switch M10 are non-conducting while the seventh switch M7, the eighth switch M8, and the ninth switch M9 are conducting. As a result, the voltage $V_{BAT}$ is applied to the second electrode 136 of the second capacitor CF2 while the first electrode 134 of the second capacitor CF2 is effectively coupled to the first output LX1 and the second output LX2. Therefore, assuming that the second capacitor CF2 is charged to the voltage $V_{BAT}$, the voltage level at the first output LX1 and the second output LX2 will each be at a voltage level that is two times $V_{BAT}$.

After a fourth predetermined time t4 the control signal CS8 transitions to logic low (L) to float the second terminal 146 of the eighth switch M8. After a fifth predetermined time t5 the control signal CS7 transitions to logic low (L) to float the second terminal 140 of the seventh switch M7 and the control signal CS9 transitions to logic low to allow the second capacitor CF2 to charge during a new cycle.

Figure 11:
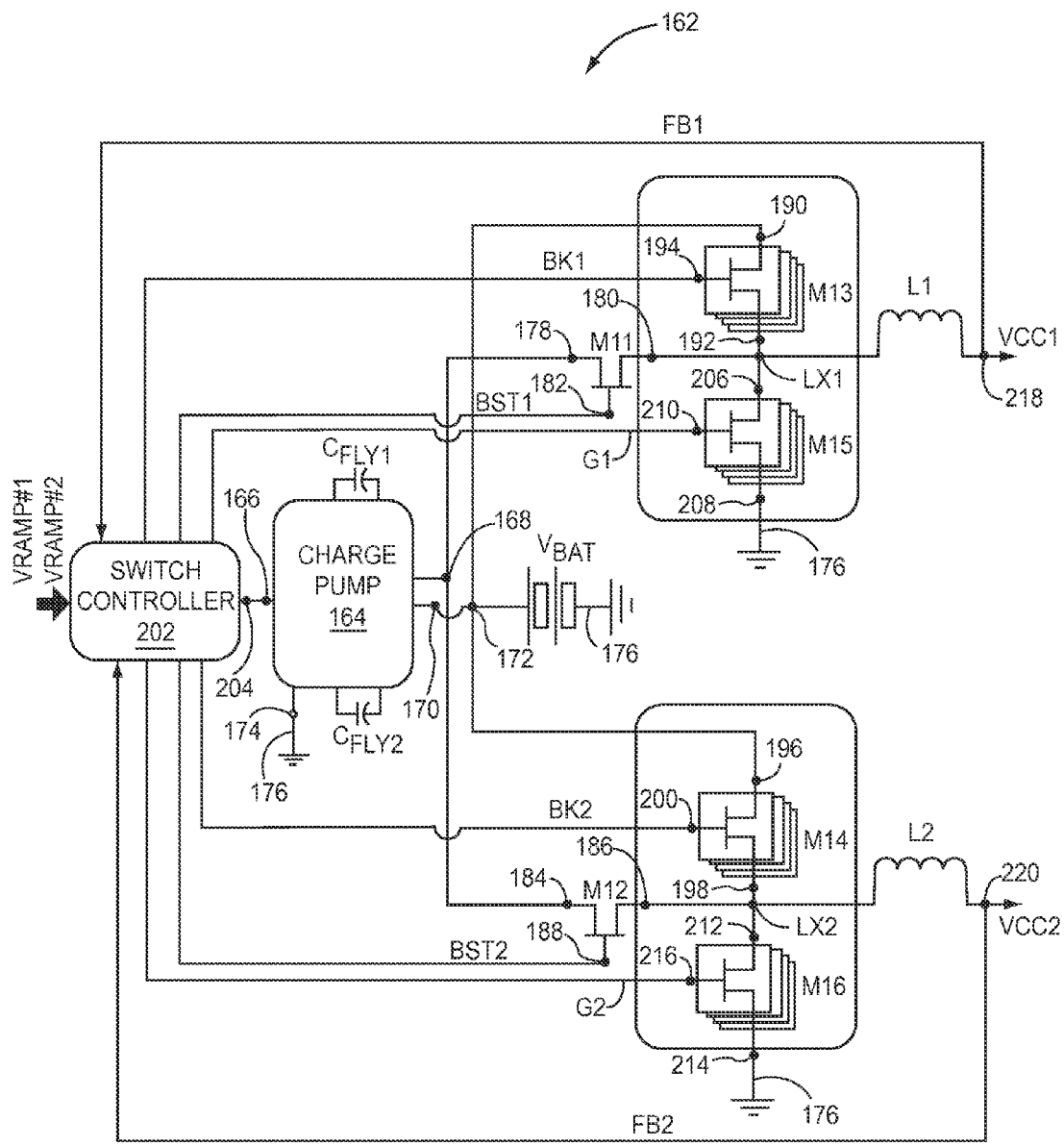
FIG. 11 is a circuit diagram of a charge pump system according to the present disclosure.

FIG. 11 is a circuit diagram of a charge pump system 162. A charge pump 164 has a switch control input 166, a voltage output terminal 168, a high voltage terminal 170 coupled to a high voltage node 172 and a low voltage terminal 174 coupled to a low voltage node 176. Typically, a battery having a voltage $V_{BAT}$ is coupled between the high voltage node 172 and the low voltage node 176. The low voltage node 176 is typically at ground potential. The charge pump 164 also includes a first capacitor $C_{FLY1}$ and a second capacitor $C_{FLY2}$ to allow dual phase operation. Typically, the first capacitor $C_{FLY1}$ and the second capacitor $C_{FLY2}$ each have a capacitance value that ranges from around 220 nF to around 440 nF.

A first boost switch M11 includes a first terminal 178 coupled to the voltage output terminal 168 of the charge pump 164, a second terminal 180 coupled to a voltage output node LX1, and a first control terminal 182 for receiving a first boost signal BST1. A second boost switch M12 has a first terminal 184 coupled to the voltage output terminal 168 of the charge pump 164, a second terminal 186 coupled to a second output node LX2, and a control terminal 188 for receiving a second boost signal BST2.

A first buck switch M13 has a first terminal 190 coupled to the high voltage node 172, a second terminal 192 coupled to the first output node LX1, and a control terminal 194 for receiving a first buck signal BK1. A second buck switch M14 has a first terminal 196 coupled to the high voltage node 172, a second terminal 198 coupled to the second output node LX2, and a control terminal 200 for receiving a second buck signal BK2.

A switch controller 202 has an output 204 coupled to the switch control input 166 of the charge pump 164. The switch controller 202 is adapted to generate the first boost signal BST1, the second boost signal BST2, the first buck signal BK1, and the second buck signal BK2 such that a first voltage pulse output from the second terminal 180 of the first boost switch M11 and a second voltage pulse output from the second terminal 186 of the second boost switch M12 are asymmetrical and coincidental. Typically, the first boost signal BST1, the second boost signal BST2, the first buck switch BK1, and the second buck signal BK2 are switch phases that each have a frequency that ranges from around 1 MHz to around 5 MHz.

In the embodiment shown in FIG. 11, the charge pump system 162 further includes a first grounding switch M15 having a first terminal 206 coupled to the first output node LX1, a second terminal 208 coupled to the low voltage node 176, and a control terminal 210 for receiving a first grounding signal G1. Also included is a second grounding switch M16 having a first terminal 212 coupled to the second output node LX2, a second terminal 214 coupled to the low voltage node 176, and a control terminal 216 for receiving a second grounding signal G2.

The switch controller 202 is further adapted to generate the first boost signal BST1 and the second boost signal BST2 such that a first voltage pulse output from the second terminal 180 of the first boost switch M11 and a second voltage output from the second terminal 186 of the second boost switch M12 each reach a voltage level that is about twice a voltage level of the high voltage node 172. The switch controller 202 is still further adapted to generate the first buck signal BK1 and the second buck signal BK2 such that a first voltage pulse output from the second terminal 192 of the first buck switch M13 and a second voltage pulse output from the second terminal 198 of the second buck switch M14 each reach a voltage level that is about equal to the voltage level of the high voltage node 172. The switch controller 202 is yet further adapted to generate the first grounding signal G1 and the second grounding signal G2 such that a first voltage level at the first output node LX1 and a second voltage at the second output node LX2 are each about equal to the voltage level of the low voltage node 176.

The charge pump system 162 further includes a first inductor L1 that is coupled between the first output node LX1 and a first source node 218 to reduce voltage ripple in a first voltage level output from the first source node 218. A second inductor L2 is coupled between the second output node LX2 and a second source node 220 to reduce voltage ripple in a second voltage output from the second source node 220.

Typically, the first inductor L1 and the second inductor L2 each have an inductance value that ranges from around 1 μH to around 3 μH.

In the embodiment shown in FIG. 11, the charge pump system 162 further includes a first voltage feedback loop FB1 coupled between the first source node 218 and the switch controller 202, and a second voltage feedback loop FB2 coupled between the second source node 220 and the switch controller 202. The switch controller 202 is responsive to threshold signals $V_{RAMP\#1}$ and $V_{RAMP\#2}$. The first voltage feedback loop FB1 and the second voltage feedback loop FB2 are adapted to urge source voltages VCC1 and VCC2 to match the demands of the threshold signals $V_{RAMP\#1}$ and $V_{RAMP\#2}$.

Figure 12:
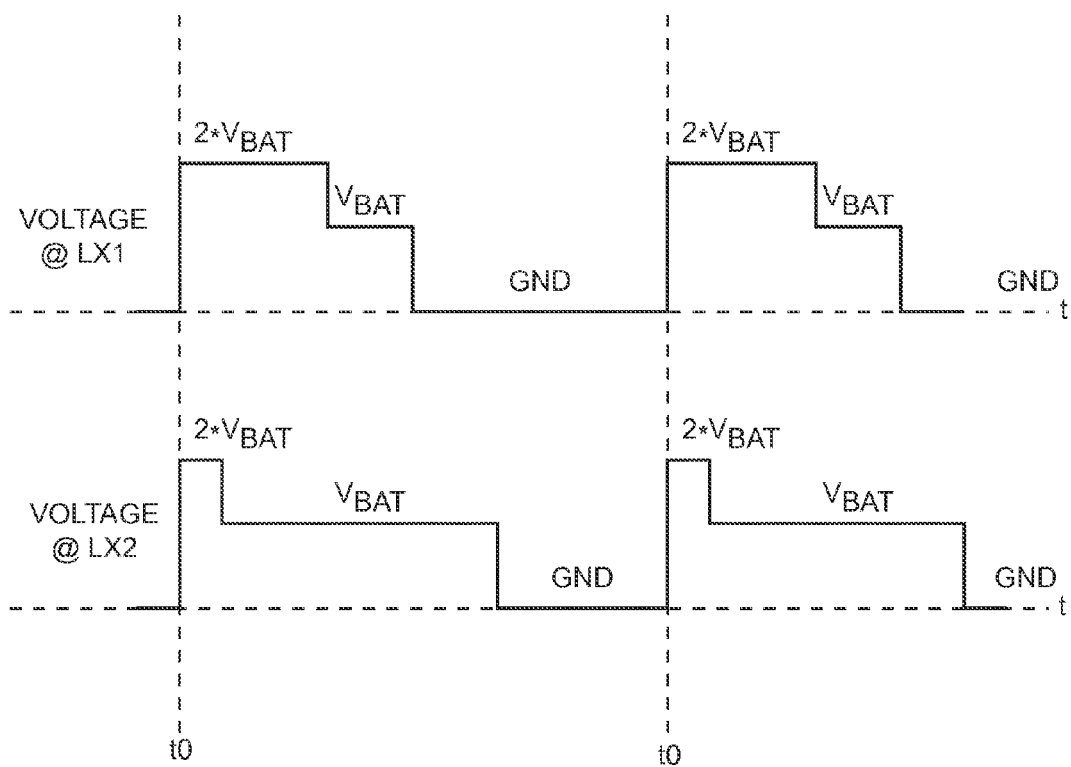
FIG. 12 is a timing diagram depicting two cycles of voltages generated by the charge pump system of FIG. 11.

FIG. 12 is a timing diagram depicting two cycles of the voltages at the first output node LX1 and the second output node LX2 generated by the charge pump system 162 (FIG. 11). In operation, the voltage level at the voltage output terminal 168 (FIG. 11) is about twice the voltage level of the voltage level at the high voltage node 172 (FIG. 11). As a result, at the beginning of a first cycle, voltage pulses output from the first boost switch M11 (FIG. 11) and the second boost switch M12 (FIG. 11) each have a voltage amplitude that is twice the voltage level at the high voltage node 172, which is typically at the voltage level of the voltage $V_{BAT}$. Voltage pulses output from the first buck switch M13 (FIG. 11) and the second buck switch M14 (FIG. 11) each have a voltage amplitude that is about equal to the voltage level at the high voltage node 172, which in the particular case has a voltage level equal to the voltage $V_{BAT}$. Near the end of the first cycle, the first grounding switch M15 (FIG. 11) and the second grounding switch M16 (FIG. 11) pull the first output node LX1 and the second output node LX2 to the voltage level of the low voltage node 176, which in this particular case is at ground (GND) potential.

Figure 13:
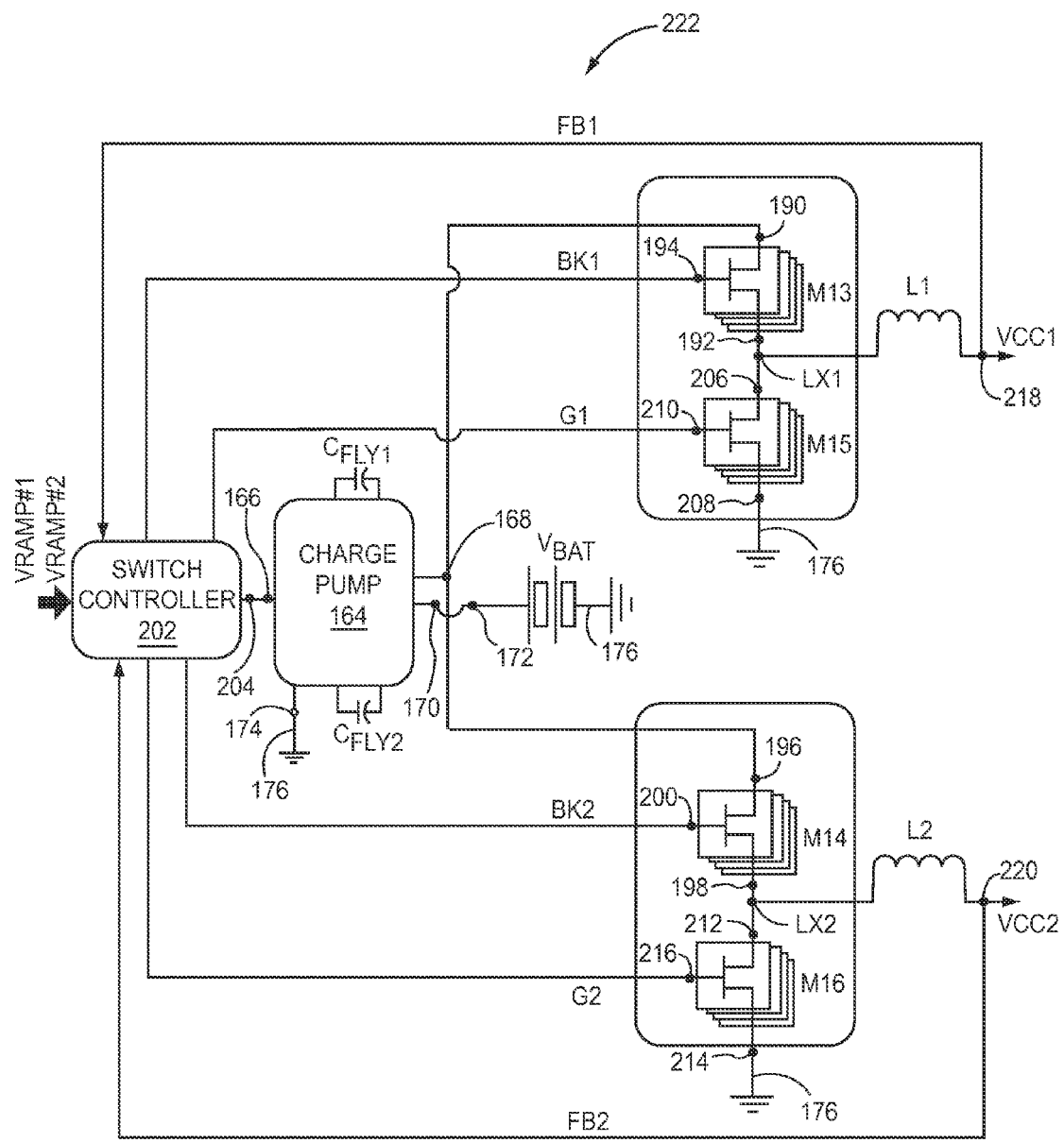
FIG. 13 is a circuit diagram depicting a charge pump system that is a reconfiguration of the charge pump system FIG. 11.

FIG. 13 is a circuit diagram depicting a charge pump system 222 that is a reconfiguration of the charge pump system 162 (FIG. 11). In particular, the first boost switch M11 (FIG. 11) and the second boost switch M12 (FIG. 11) are removed, and the first terminal 190 of first buck switch M13 and the first terminal 196 of the second buck switch M14 are coupled to the voltage output terminal 168 instead of being coupled to the high voltage node 172. In this way, the first buck switch M13 and the second buck switch M14 function as buck/boost switches as opposed to being limited to a buck function as with the charge pump 162.

Figure 14:
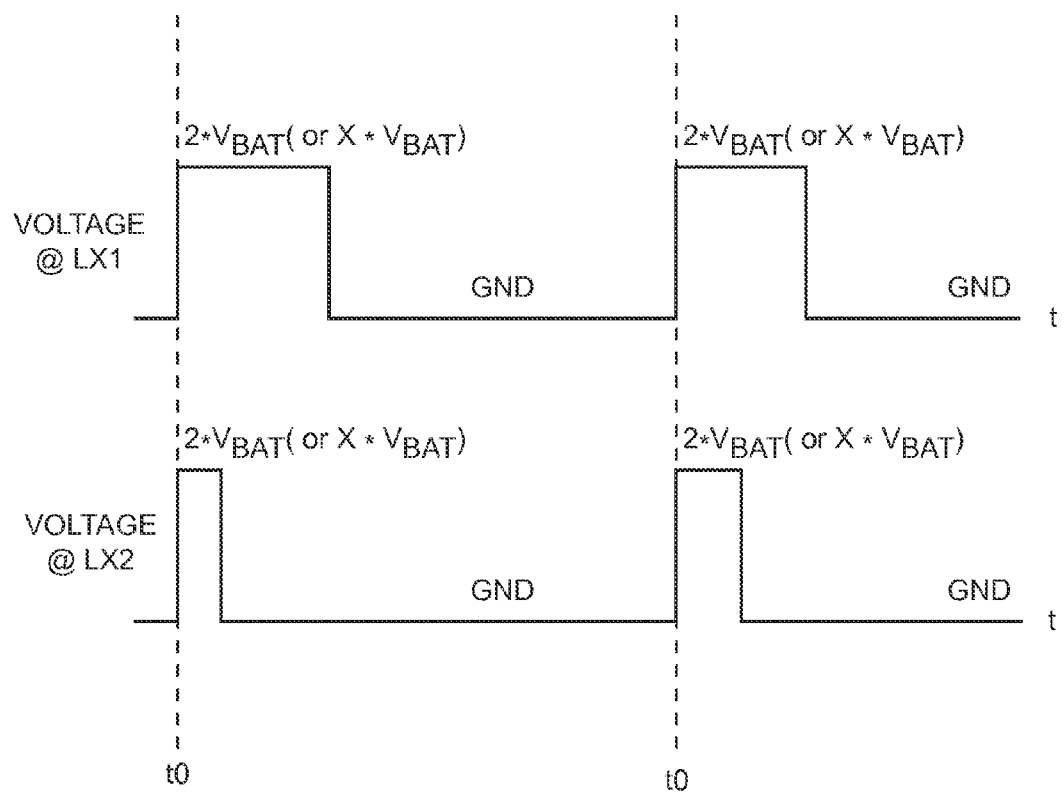
FIG. 14 is a timing diagram depicting two cycles of voltages generated by the charge pump system of FIG. 13.

FIG. 14 is a timing diagram depicting two cycles of the voltages at the first output node LX1 and the second output node LX2 generated by the charge pump system 222 (FIG. 13). In operation, the voltage level at the voltage output terminal 168 (FIG. 13) is about twice the voltage level of the voltage level at the high voltage node 172 (FIG. 13). As a result, at the beginning of a first cycle, voltage pulses output from the first buck switch M13 (FIG. 13) and the second buck switch M14 (FIG. 13) each have a voltage amplitude that is about equal to the voltage level at the voltage output terminal 168. The switch controller 202 (FIG. 13) controls the charge pump 164 such that the voltage level at the voltage output terminal 168 can vary between the voltage level at the low voltage node 176 and twice the voltage level at the high voltage node 172. Therefore, the voltage level output from the second terminal 192 of the first buck switch M13 and the voltage level output from the second terminal 198 of the second buck switch M14 can approach the voltage level at the low voltage node 176, which in this particular case is at ground potential (GND). Moreover, the voltage level output from the second terminal 192 of the first buck switch M13 and the voltage level output from the second terminal 198 of the second buck switch M14 can approach twice the voltage level at the high voltage node 172, which in the particular case shown in FIG. 14 is at the voltage level $V_{BAT}$. Near the end of the first cycle, the first grounding switch M15 (FIG. 13) and the second grounding switch M16 (FIG. 13) pull the first output node LX1 and the second output node LX2 to the voltage level of the low voltage node 176, which in this particular case is at ground (GND) potential.

Figure 15:
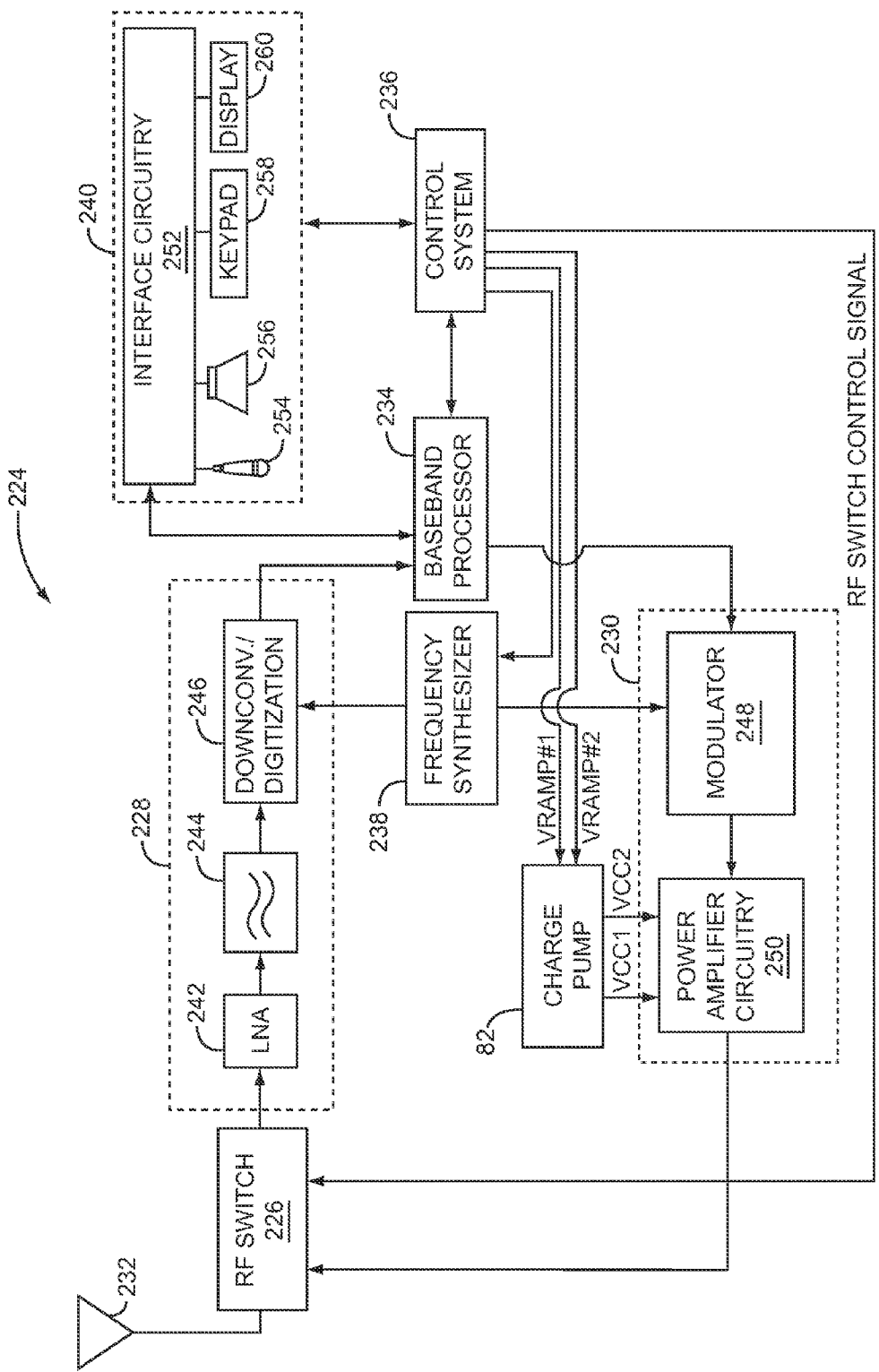
FIG. 15 is a block diagram of a mobile terminal that incorporates a charge pump in accordance with the present disclosure.

Turning now to FIG. 15, the charge pump 82 is incorporated in a mobile terminal 224, such as a cellular handset, a personal digital assistant (PDA), or the like. The basic architecture of the mobile terminal 224 may include an RF switch 226, a receiver front end 228, an RF transmitter section 230, an antenna 232, a baseband processor 234, a control system 236, a frequency synthesizer 238, and an interface 240. The receiver front end 228 receives information bearing RF signals from one or more remote transmitters provided by a base station (not shown). A low noise amplifier (LNA) 242 amplifies the signal. A filter circuit 244 minimizes broadband interference in the received signal, while downconversion and digitization circuitry 246 downconverts the filtered, received signal to an intermediate or baseband frequency signal, which is then digitized into one or more digital streams. The receiver front end 228 typically uses one or more mixing frequencies generated by the frequency synthesizer 238.

The baseband processor 234 processes the digitized received signal to extract the information or data bits conveyed in the received signal. This processing typically comprises demodulation, decoding, and error correction operations. As such, the baseband processor 234 is generally implemented in one or more digital signal processors (DSPs).

On the transmit side, the baseband processor 234 receives digitized data, which may represent voice, data, or control information from the control system 236 which it encodes for transmission. The encoded data is output to the RF transmitter section 230, where it is used by a modulator 248 to modulate a carrier signal that is at a desired transmit frequency. Power amplifier (PA) circuitry 250 amplifies the modulated carrier signal to a level appropriate for transmission from the antenna 232.

A user may interact with the mobile terminal 224 via the interface 240, which may include interface circuitry 252 associated with a microphone 254, a speaker 256, a keypad 258, and a display 260. The interface circuitry 252 typically includes analog-to-digital converters, digital-to-analog converters, amplifiers, and the like. Additionally, it may include a voice encoder/decoder, in which case it may communicate directly with the baseband processor 234.

The microphone 254 will typically convert audio input, such as the user's voice, into an electrical signal, which is then digitized and passed directly or indirectly to the baseband processor 234. Audio information encoded in the received signal is recovered by the baseband processor 234 and converted into an analog signal suitable for driving the speaker 256 by the interface circuitry 252. The keypad 258 and the display 260 enable the user to interact with the mobile terminal 224 inputting numbers to be dialed, address book information, or the like, as well as monitoring call progress information.

Those skilled in the art will recognize improvements and modifications to the preferred embodiments of the present disclosure. All such improvements and modifications are considered within the scope of the concepts disclosed herein and the claims that follow.

What is claimed is:

1. A charge pump for providing independent voltages, comprising:
    a first output;
    a second output;
    at least one capacitor;
    a plurality of switches; and
    a switch controller adapted to generate control signals for the plurality of switches to selectively couple the at least one capacitor between a high voltage node and a low voltage node during charging phases, and to selectively couple the at least one capacitor to the first output and the second output during discharging phases that output a first voltage pulse from the first output and a second voltage pulse from the second output such that the first voltage pulse and the second voltage pulse are asymmetrical and coincidental, and wherein the first voltage pulse and the second voltage pulse each reach a voltage level that is about twice the voltage level between the high voltage node and the low voltage node.

2. The charge pump of claim 1 wherein the plurality of switches includes:
    a first switch coupled between a first electrode of the at least one capacitor and the high voltage node:
    a second switch coupled between the first electrode of the at least one capacitor and the first output;
    a third switch coupled between the first electrode of the at least one capacitor and the second output;
    a fourth switch coupled between the high voltage node and a second electrode of the at least one capacitor; and
    a fifth switch coupled between the second electrode of the at least one capacitor and the low voltage node.

3. The charge pump of claim 1 wherein the switch controller is further adapted to generate the control signals such that the first voltage pulse and the second voltage pulse rise simultaneously, but fall at different times.

4. The charge pump of claim 1 wherein the switch controller is further adapted to generate the control signals such that the first voltage pulse and the second voltage pulse rise at different times, but fall simultaneously.

5. The charge pump of claim 1 wherein a first inductor is coupled to the first output to filter the first voltage pulse, and wherein a second inductor is coupled to the second output to filter the second voltage pulse.

6. The charge pump of claim 5 wherein the first inductor and the second inductor each have an inductance value that ranges from around 1 µH to around 3 µH.

7. The charge pump of claim 1 wherein the at least one capacitor has a capacitance value that ranges from around 220 nF to around 440 nF.

8. The charge pump of claim 1 wherein the control signals are switch phases that each have a frequency that ranges from around 1 MHz to around 5 MHz.

9. The charge pump of claim 1 being adapted to couple with a charge pump system comprising N charge pumps that operate with N phases.

10. The charge pump of claim 1 wherein the low voltage node is at ground potential.

11. The charge pump of claim 1 wherein the plurality of switches comprises electronic switches that each have a control terminal.

12. The charge pump of claim 11 wherein the electronic switches are field effect transistors (FETs).

13. A mobile terminal comprising:
    a first power amplifier having a power input terminal;
    a second power amplifier having a power input terminal;
    a charge pump for providing independent voltages, comprising:
        a first output;
        a second output;
        at least one capacitor;
        a plurality of switches; and
        a switch controller adapted to generate control signals for the plurality of switches to selectively couple the at least one capacitor between a high voltage node and a low voltage node during charging phases, and to selectively couple the at least one capacitor to the first output and the second output during discharging phases that output a first voltage pulse from the first output and a second voltage pulse from the second output such that the first voltage pulse and the second voltage pulse are asymmetrical and coincidental, and wherein the first voltage pulse and the second voltage pulse each reach a voltage level that is about twice the voltage level between the high voltage node and the low voltage node.

14. The mobile terminal of claim 13 wherein the plurality of switches includes:
    a first switch coupled between a first electrode of the at least one capacitor and the high voltage node:
    a second switch coupled between the first electrode of the at least one capacitor and the first output;
    a third switch coupled between the first electrode of the at least one capacitor and the second output;
    a fourth switch coupled between the high voltage node and a second electrode of the at least one capacitor; and
    a fifth switch coupled between the second electrode of the at least one capacitor and the low voltage node.

15. The mobile terminal of claim 13 wherein the switch controller is further adapted to generate the control signals such that the first voltage pulse and the second voltage pulse rise simultaneously, but fall at different times.

16. The mobile terminal of claim 13 wherein the switch controller is further adapted to generate the control signals such that the first voltage pulse and the second voltage pulse rise at different times, but fall simultaneously.

17. The mobile terminal of claim 13 wherein a first inductor is coupled to the first output to filter the first voltage pulse, and wherein a second inductor is coupled to the second output to filter the second voltage pulse.

18. The mobile terminal of claim 17 wherein the first inductor and the second inductor each have an inductance value that ranges from around 1 µH to around 3 µH.

19. The mobile terminal of claim 13 wherein the at least one capacitor has a capacitance value that ranges from around 220 nF to around 440 nF.

20. The mobile terminal of claim 13 wherein the control signals are switch phases that each have a frequency that ranges from around 1 MHz to around 5 MHz.

21. The mobile terminal of claim 13 wherein the charge pump is adapted to couple with a charge pump system comprising N charge pumps that operate with N phases.

22. The mobile terminal of claim 13 wherein the low voltage node is at ground potential.

23. The mobile terminal of claim 13 wherein the plurality of switches comprises electronic switches that each have a control terminal.

24. The mobile terminal of claim 23 wherein the electronic switches are field effect transistors (FETs).

* * * * *